US012658700B1

(12) United States Patent
Alsaba et al.

(10) Patent No.: US 12,658,700 B1
(45) Date of Patent: Jun. 16, 2026

(54) DEEP REINFORCEMENT LEARNING DIFFERENTIAL PROTECTION SYSTEM FOR ELECTRIC POWER NETWORKS

(71) Applicant: King Fahd University of Petroleum and Minerals, Dhahran (SA)

(72) Inventors: Mohammed Taher Ali Alsaba, Dhahran (SA); Mohamed Ali Abido, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/408,774

(22) Filed: Dec. 4, 2025

(51) Int. Cl.
  *H02J 3/001* (2026.01)
  *H02J 103/30* (2026.01)
(52) U.S. Cl.
  CPC ........... *H02J 3/001* (2020.01); *H02J 2103/30* (2026.01)
(58) Field of Classification Search
  CPC ............................. H02J 3/001; H02J 2103/30
  USPC ........................................................ 700/286
  See application file for complete search history.

(56) References Cited

FOREIGN PATENT DOCUMENTS

| | | |
|---|---|---|
| CN | 116449255 B | 12/2023 |
| CN | 119004065 A | 11/2024 |
| CN | 119989909 A | 5/2025 |

OTHER PUBLICATIONS

Zhang (NPL: AME-TCN: Attention Mechanism Enhanced Temporal Convolutional Network for Fault Diagnosis in Industrial Processes, 2021 Global Reliability and Prognostics and Health Management (PHM-Nanjing)) (Total pp. 6) (Year: 2021).*

Lu (NPL: Data-driven fault detection of power distribution network based on temporal convolutional network and long short-term memory, 2023 International Conference on Sensing, Measurement Data Analytics in the era of Artificial Intelligence) (Total pp. 6) (Year: 2023).*

Guangxun E., et al., "A Novel Attention Temporal Convolutional Network for Transmission Line Fault Diagnosis via Comprehensive Feature Extraction", Energies 2023, vol. 16, Issue 20, 7105, Oct. 16, 2023 (21 pages).

Amir Imani, et al., "A novel MODWT-based fault detection and classification scheme in VSC-HVDC transmission line", Electric Power Systems Research, vol. 221, 109434, Aug. 2023 (available on line Apr. 28, 2023), 8 pages (excerpts only).

* cited by examiner

*Primary Examiner* — Jigneshkumar C Patel
(74) *Attorney, Agent, or Firm* — Oblon, McClelland, Maier & Neustadt, L.L.P.

(57) ABSTRACT

A method for diagnosing a fault in an electric power distribution network includes measuring three-phase current signals from local and remote terminals of a protected zone on the network, and computing differential current signals based on the measured three-phase current signals. The differential current signals are preprocessed using a filter to smooth the differential current signals. A maximal overlap discrete wavelet transform is applied on the smoothed differential current signals to obtain a plurality of detail coefficients. Observation signals comprising the plurality of detail coefficients are provided to a deep reinforcement learning (DRL) agent comprising a temporal convolution attention-based neural network (TCAN). The TCAN DRL agent is trained using a proximal policy optimization (PPO) method to propose a trip action corresponding to a trip or no trip command for a fault condition. Responsive to receiving a trip command, a trip signal is transmitted to a circuit breaker.

20 Claims, 13 Drawing Sheets

700

DEEP REINFORCEMENT LEARNING DIFFERENTIAL PROTECTION SYSTEM FOR ELECTRIC POWER NETWORKS

BACKGROUND

Technical Field

The present disclosure relates to electrical power distribution network protection systems, and more particularly to a deep reinforcement learning-based differential protection system using temporal convolution attention-based neural networks.

Description of Related Art

The "background" description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Differential protection detects internal faults by comparing the current entering and leaving a protected object, system, or equipment. In accordance with Kirchhoff's current law, the sum of these currents under normal operating conditions is zero, excluding magnetizing and charging currents. A differential relay operates when a differential current appears, indicating an internal fault. To ensure sensitivity and avoid maloperation due to current transformer errors, differential relays incorporate restraint or bias characteristics, stabilizing the pickup threshold proportional to load or through-current.

Microgrids integrate distributed generation resources such as solar photovoltaic, wind, and diesel generators, and they may operate in both grid-connected and islanded modes. These configurations introduce challenges to differential protection. Fault current contributions vary with topology, source mix, and operating state, resulting in unpredictable current magnitudes and directions. High impedance faults, which occur when a conductor contacts resistive surfaces such as soil, foliage, asphalt, or construction equipment, produce currents often below 10% of the rated current, making them especially difficult to detect. For example, a downed conductor resting on dry sand may yield weak and intermittent arcing currents that fall outside relay pickup settings, while an arcing branch contact in an islanded feeder may generate distorted, low magnitude currents masked by inverter harmonics.

Several research efforts and technological developments have addressed these challenges. Energy-based differential analysis has been applied to separate fault transients from non-fault events such as capacitor switching and nonlinear load operation. In one approach, the energy of positive sequence differential currents was analyzed to identify high impedance faults with reported accuracy near 98% on IEEE test feeders. However, the method relied on predetermined thresholds and exhibited false tripping during non-fault events, raising concerns about adaptability across different networks. Other work extracted transient energy from superimposed impedance components, also requiring predefined thresholds and high sampling rates for implementation.

Wavelet-domain methods have been used to analyze differential currents within protection zones. Discrete wavelets transform-based schemes demonstrated detection and classification within milliseconds, with reported reliability above 97% in both grid-connected and islanded modes. Despite these results, heavy reliance on threshold selection and validation limited to simulations indicated challenges in field deployment. Teager-Kaiser energy operator-based methods have also been explored, offering high accuracy and fast fault detection in microgrid simulations, but requiring sampling rates higher than those typically practical in protective relays and lacking real-time validation.

Maximal overlap discrete wavelet transform (MODWT) has been examined in high-voltage direct current protection studies, showing robustness against noise, independence from down-sampling, and suitability at lower sampling frequencies. While demonstrated in direct current networks, these studies highlight the potential of wavelet-derived transient energy features for reliable discrimination of fault events under noisy conditions.

In parallel, machine learning-based methods have emerged. Attention-augmented temporal convolutional networks have been proposed for transmission line fault diagnosis, combining dilated convolutional layers, principal component analysis, and multihead attention to capture both local and global temporal features. These models illustrate the potential of deep learning architectures to improve classification accuracy in noisy and complex environments.

Patented developments provide further context. CN119004065A discloses a fault detection method for high-voltage relay protection that employs sampling data, knowledge graph construction, and rule-classifier fusion to improve accuracy, though it primarily addresses device-level protection rather than feeder-level differential protection in microgrids. CN116449255B discloses a box-type transformer fault detection system that integrates acoustic vibration sensors with electrical measurements for transformer diagnostics, which, while effective for equipment health monitoring, does not address high impedance fault detection in feeder lines. CN119989909A discloses a relay protection simulation system employing deep learning with convolutional and recurrent neural networks to analyze multi-source data, focusing on simulation workflows rather than practical microgrid deployment for differential protection under real-time constraints.

Despite these advances, several challenges remain. Many existing methods depend on threshold tuning, which reduces adaptability and increases the risk of false operations under normal transients. A number of approaches require unusually high sampling frequencies that are impractical for protective relay environments. Others have demonstrated results only through simulations without real-time hardware validation, leaving their field applicability uncertain. Approaches centered on equipment diagnostics or knowledge graph methods address device-level faults but not the line-level differential protection problem in microgrids with variable topologies.

Accordingly, there is a need for differential protection frameworks that can accurately and selectively detect both low and high impedance faults in microgrid environments under radial, ring, and islanded modes, that remain secure under noise and switching transients, that do not rely on extensive threshold tuning, and that are compatible with practical sampling rates and real-time operation requirements.

SUMMARY

Aspects of the present disclosure provide methods and systems for enhanced fault detection and classification in electric power distribution networks using deep reinforcement learning-based differential protection with temporal convolution attention-based neural networks to reliably detect high-impedance and high-resistance faults under varying operating conditions and noise environments.

According to an aspect of the present disclosure, a method for diagnosing a fault in an electric power distribution network is provided. The method comprises measuring three-phase current signals from local and remote terminals of a protected zone on the electric power distribution network. The method comprises computing differential current signals based on the measured three-phase current signals. The method comprises preprocessing the differential current signals using a filter to smooth the differential current signals. The method comprises applying a maximal overlap discrete wavelet transform (MODWT) on the smoothed differential current signals to obtain a plurality of detail coefficients. The method comprises providing observation signals comprising at least the plurality of detail coefficients to a deep reinforcement learning (DRL) agent comprising a temporal convolution attention-based neural network (TCAN), the TCAN DRL agent being trained using a proximal policy optimization (PPO) method to propose a trip action corresponding to a trip or no trip command for a fault condition. The method comprises, responsive to receiving a trip command, transmitting a trip signal to a circuit breaker.

According to another aspect of the present disclosure, a method for diagnosing a fault in an electric power distribution network is provided. The method comprises receiving a dataset of test observation signals comprising (i) a plurality of test detail coefficients obtained from applying a maximal overlap discrete wavelet transform (MODWT) to smoothed test differential current signals, (ii) a test error signal corresponding to a difference between a past test trip action and a reference ground truth signal, (iii) a test integrated error representative of a history of past errors, and (iv) a test action control signal representative of the past test trip action. The method comprises training a deep reinforcement learning (DRL) agent, comprising a temporal convolution attention-based neural network (TCAN), by providing the test observation signals to the TCAN DRL agent to propose, based on the test observation signals, a trip action corresponding to a trip or no-trip command for a fault condition. The TCAN DRL agent is trained using a proximal policy optimization (PPO) method.

According to another aspect of the present disclosure, a system for diagnosing a fault in an electric power distribution network is provided. The system comprises a processor configured to measure three-phase current signals from local and remote terminals of a protected zone on the electric power distribution network. The processor is configured to compute differential current signals based on the measured three-phase current signals. The processor is configured to preprocess the differential current signals using a filter to smooth the differential current signals. The processor is configured to apply a maximal overlap discrete wavelet transform (MODWT) on the smoothed differential current signals to obtain a plurality of detail coefficients. The processor is configured to provide observation signals comprising the plurality of detail coefficients to a deep reinforcement learning (DRL) agent comprising a temporal convolution attention-based neural network (TCAN), the TCAN DRL agent being trained using a proximal policy optimization (PPO) method to propose a trip action corresponding to a trip or no trip command for a fault condition.

The processor is configured to transmit, responsive to receiving a trip command, a trip signal to a circuit breaker.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
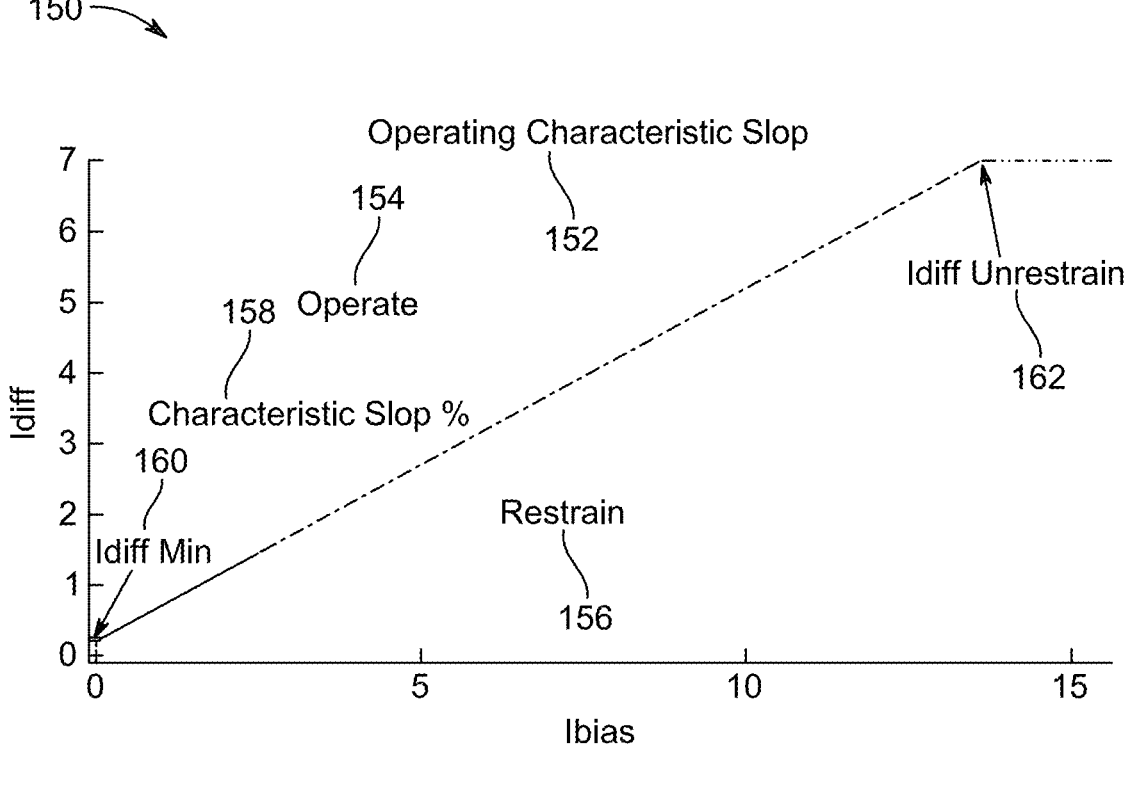
FIG. 1 is a graph illustrating an operating characteristic plot for phase current differential protection, according to aspects of the present disclosure.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

FIG. 1 is a graph 150 that illustrates an example operating characteristic slope 152 of a conventional biased differential relay protection scheme. The horizontal axis represents the bias current $I_{bias}$, and the vertical axis represents the differential current $I_{diff}$. The characteristic curve 152 is divided into two principal regions, namely an operate region 154 and a restrain region 156.

In the illustrated example, a minimum differential current threshold $I_{diff}$ min 160 is defined, below which no tripping occurs regardless of the bias current magnitude. The slope of the characteristic curve, indicated as characteristic slope percentage 158, determines the increase in required $I_{diff}$ for operation as $I_{bias}$ increases. The operate region 154 is located above the characteristic line, where the differential current magnitude exceeds the tripping threshold for the corresponding bias current value. The restrain region 156 is located below the characteristic line, where the measured $I_{diff}$ is insufficient (for example, below a predetermined threshold) to initiate a trip.

The illustrated characteristic includes a saturation limit at the upper end, where $I_{diff}$ reaches a maximum operating limit 162 $I_{diff}$ restrain beyond which the trip decision remains unaffected by further increases in bias current. This bias-restraint characteristic is conventionally used to improve security against external faults and current transformer (CT) saturation effects.

In the context of high-impedance faults (HIFs), the differential current generated during such events often remains within the restrain region 156, failing to cross the characteristic slope 158 into the operate region 154. This limitation highlights a detection gap in conventional biased differential protection methods, which motivates the development of enhanced detection techniques capable of accurately identifying fault conditions that produce low fault current magnitudes.

Figure 2:
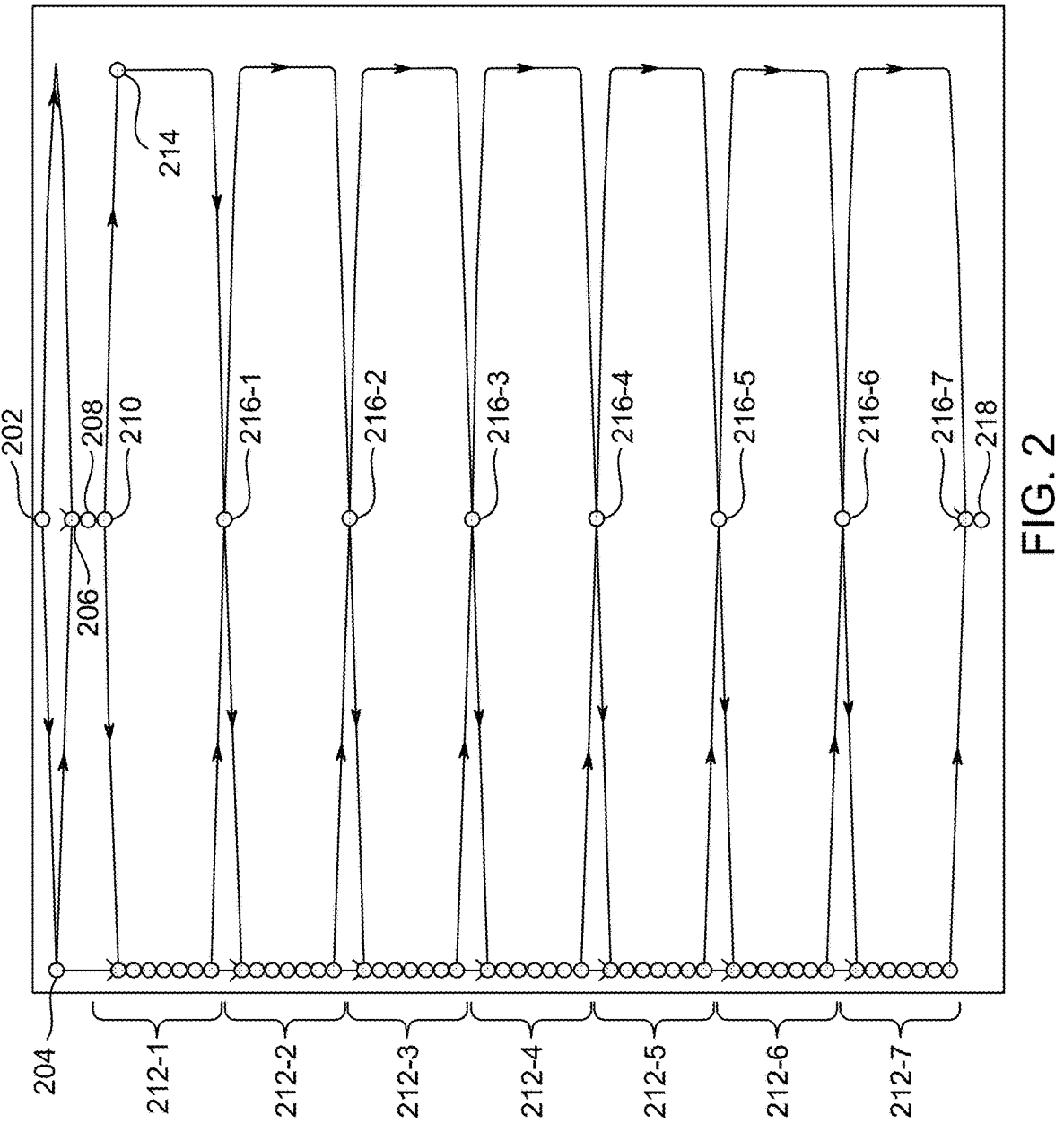
FIG. 2 is a sketch illustrating a a temporal convolution attention-based neural network architecture, according to aspects of the present disclosure.

FIG. 2 illustrates an example architecture 200 of a temporal convolution attention-based neural network of the DRL agent. The TCAN architecture 200 is configured to receive the observation signals generated by a processor and output a trip action corresponding to a trip or no-trip command for a fault condition.

The TCAN architecture 200 includes a sequence input layer 202 configured to receive observation signals. In an example, the observation signals may include the first, second, and third levels of MODWT detail coefficients for each phase of the differential current signals, per-phase energy values, and an action control signal representative of a previous trip action.

The sequence input layer 202 is coupled to a position embedding layer 204 configured to generate positional encoding vectors that preserve the temporal order of the input features. The outputs of the position embedding layer 204 are combined with the sequence input features using an addition layer 206.

The addition layer 206 provides its output to a first self-attention layer 208 configured to learn contextual dependencies between elements in the input sequence by computing attention weights over the entire observation vector. The first self-attention layer 208 may be implemented with a causal attention mask to preserve sequence order. The output of the first self-attention layer 208 is provided to a second self-attention layer 210, which may be implemented without a causal attention mask to allow bidirectional context. In some examples, each self-attention layer may be implemented with 9 attention heads and 288 key channels.

The output of the second self-attention layer 210 is provided to a plurality of temporal convolution network (TCN) blocks 212. In an example, there may be seven TCN blocks 212-1 to 212-7 as shown in the figure and each may be configured for dilated one-dimensional convolutional processing of the temporal sequence. In some implementations, the dilation factors for the convolution layers in the TCN blocks follow powers of two, such as $2^{(i-1)}$ for block index i. Each TCN block 212 includes a first convolution 1D layer, a normalization layer, and a spatial dropout layer. The output of the spatial dropout layer is provided to a second convolution 1D layer, followed by a normalization layer, a rectified linear unit (ReLU) activation layer, and a spatial dropout layer. In some examples, the dropout probability is 0.02.

In some TCN blocks 212, the input to the block is also passed through a skip layer 214, which is a convolutional layer configured with a filter size of one and no dilation. The skip layer 214 is used in the first TCN block and may be omitted from subsequent blocks. The skip layer 214 output is combined with the output of the spatial dropout layer using a plurality of addition layers 216-1 to 216-7 to implement residual connections.

The output of the final TCN block 212 is provided to a fully connected layer 218. The fully connected layer 218 generates output logits corresponding to the probability of a trip action or a no-trip action. In an example, the fully connected layer 218 may provide outputs to separate policy and value heads when the TCAN architecture 200 is used in a PPO training setup.

The combination of self-attention layers 208 and 210 with TCN blocks 212 allows the DRL agent to capture both global dependencies and local temporal patterns in the observation signals. When deployed in the system 352 (shown in FIG. 3B), the TCAN architecture 200 enables rapid and reliable fault detection and classification in the protected zone under a wide range of operating conditions.

Figure 3A:
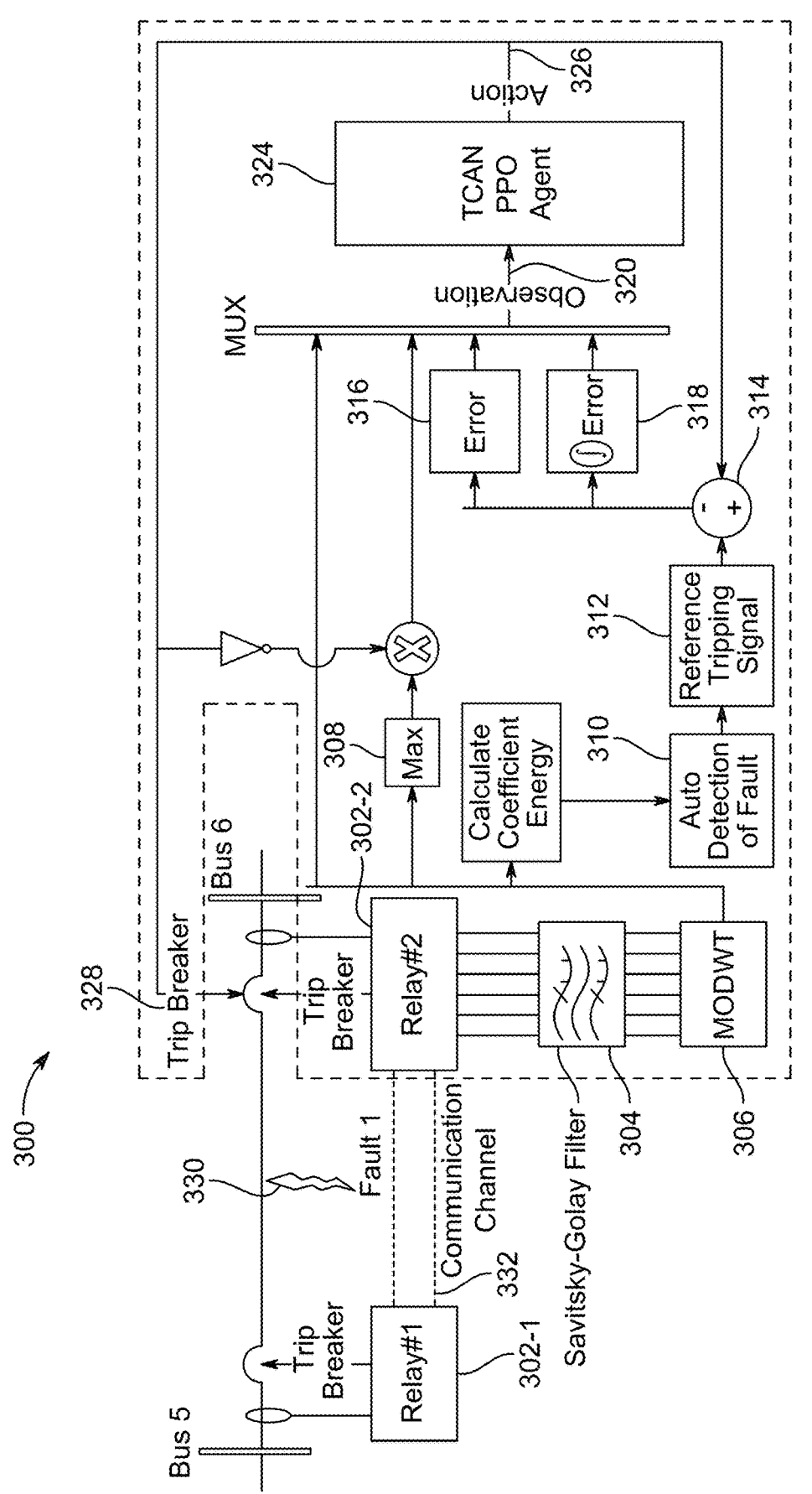
FIG. 3A is a block diagram illustrating a differential protection model, according to aspects of the present disclosure.

FIG. 3A illustrates a differential model 300 for a temporal convolution attention-based neural network (TCAN) deep reinforcement learning (DRL) agent trained using a proximal policy optimization (PPO) method for diagnosing a fault in an electric power distribution network.

The differential model 300 includes a section of a power distribution feeder extending between Bus 5 and Bus 6. Circuit breaker devices 328 are located at both ends of the feeder. Relay-I 302-1 and Relay-II 302-2 are coupled to the feeder for conventional protection operation. A simulated fault location 330 is indicated between Bus 5 and Bus 6 for generating training and testing data.

The relay module including the relay-I 302-1 and the relay-II 302-2 receive three-phase current measurements from both Bus 5 and Bus 6. The current measurements are provided to a maximal overlap discrete wavelet transform (MODWT) module 304, which decomposes the differential current signals into a plurality of detail coefficients. In an example, the detail coefficients include at least a first level, a second level, and a third level of MODWT coefficients for each phase, corresponding to different frequency bands of the differential current waveform.

A coefficient energy calculation block 306 computes the energy of the MODWT coefficients according to:

$$E_{Current} = \sum_{k=1}^{3} (W_k)^2 \qquad (1)$$

where $E_{current}$ refers to the energy of the differential current measurements, k is the level of the MODWT, and We are the MODWT coefficients. The summation may be over the first three detail levels for each phase separately, producing per-phase energy values that form part of the observation signals.

An automatic fault detection block 310 receives the coefficient energy values and is configured to detect the occurrence of a fault based on predefined logic or thresholds for training data purposes. The output of the automatic fault detection block 310 is provided to a reference tripping signal generator 312, which generates a binary reference signal, such as 1 for trip and 0 for no-trip, representing the desired tripping action for the current operating condition.

The reference tripping signal is compared with the output action of the TCAN PPO agent 324 using a comparator 314 to produce an error signal 316. The error signal 316 represents the instantaneous difference between the agent's decision and the reference ground truth signal. The error signal 316 is integrated over time in an integration block 318 to produce an integrated error signal, which captures the accumulated deviation of the DRL agent's actions from the ground truth.

The MODWT coefficients and energy values are combined with the error signal 316, the integrated error signal from block 318, and an action control signal representing the last action of the DRL agent 324, to form the observation vector 320. The observation vector 320 is provided as input to the TCAN PPO agent 324 for training or inference.

During training, the environment may add simulated noise to the measured current signals before processing in the MODWT block 304. In an example, the noise is Gaussian white noise with specific signal-to-noise ratios such as 20 dB and 30 dB, injected at the secondary current measurement level prior to preprocessing. This allows the DRL agent 324 to learn fault detection in realistic noise conditions.

The TCAN PPO agent 324 processes the observation vector 320 using its sequence input layer, position embedding layer, self-attention layers, and temporal convolution network blocks, as described in FIG. 2. The output of the agent 324 is an action signal, such as a trip or no-trip decision, which can be applied to control the circuit breaker devices 328.

The max selection block 308 may be configured to select between the measured current-based features from both terminals to ensure synchronized and valid data is processed. The architecture shown in FIG. 3A allows both offline training of the DRL agent using historical or simulated event data and real-time inference during live operation for improved detection of high-impedance and resistive faults compared to conventional protection relays.

Figure 3B:
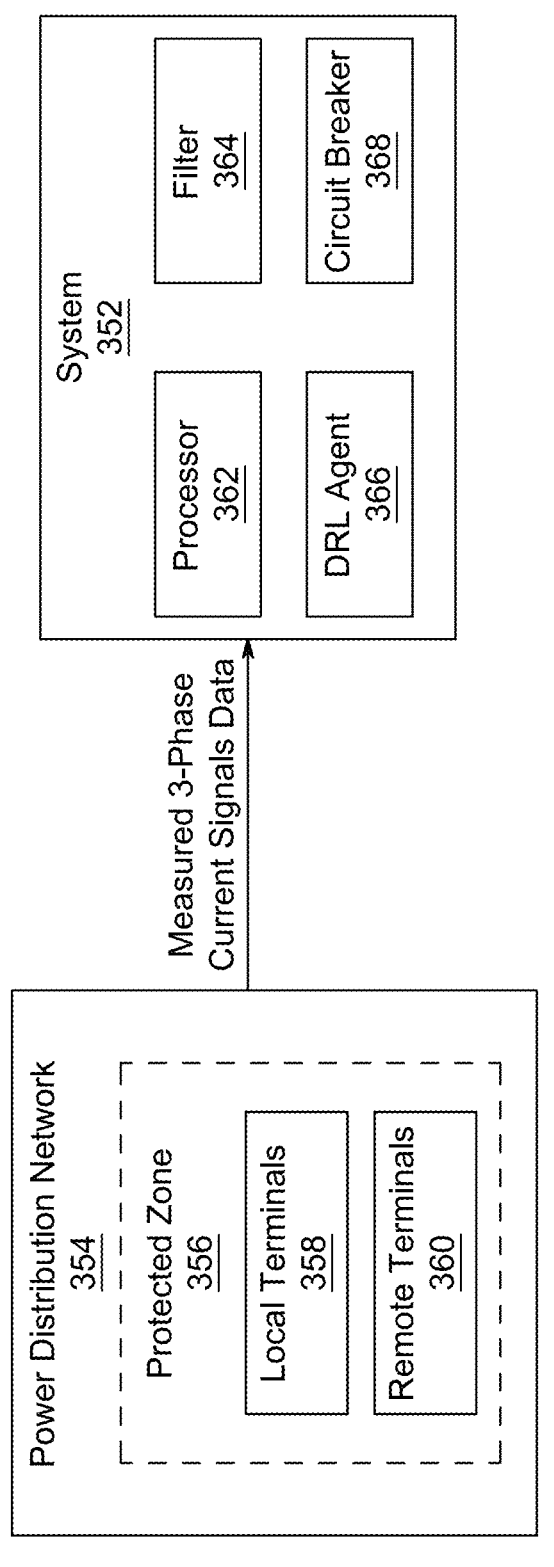
FIG. 3B is a block diagram illustrating a power distribution network with a fault detection system, according to aspects of the present disclosure.

Referring to FIG. 3B, an environment 350 illustrates a system 352 for diagnosing a fault in an electric power distribution network. The system 352 is a representation of the differential module of FIG. 3A. The environment 350 includes a power distribution network 354 and a system 352 configured to diagnose a fault in the power distribution network 354.

The power distribution network 354 includes a protected zone 356. The protected zone 356 includes local terminals 358 and remote terminals 360. The local terminals 358 and the remote terminals 360 are configured to measure three-phase current signals from respective ends of the protected zone 356. In an example, the local terminals 358 and the remote terminals 360 may be implemented using current transformers or other current-sensing devices connected to the conductors of the power distribution network 354.

The system 352 includes a processor 362, a filter 364, a deep reinforcement learning (DRL) agent 366, and a circuit breaker 368. The processor 362 is operatively coupled to the filter 364, the DRL agent 366, and the circuit breaker 368. The local terminals 358 and the remote terminals 360 are communicatively connected to the processor 362 to provide the measured three-phase current signals to the processor 362.

In operation, the processor 362 is configured to measure three-phase current signals from the local terminals 358 and the remote terminals 360 of the protected zone 356. The processor 362 computes differential current signals based on the measured three-phase current signals. In some examples, the differential current signals may represent a vector sum of all current signals entering the protected zone 356.

The processor 362 preprocesses the differential current signals using the filter 364 to smooth the differential current signals. In an example, the filter 364 may implement a Savitzky-Golay filter to reduce noise while preserving the waveform features of the differential current signals. The Savitzky-Golay filter may use a configurable window length and polynomial order, such as a window length of 5 samples and a polynomial order of 2, and may be applied independently to each phase differential current stream.

The processor 362 applies a maximal overlap discrete wavelet transform (MODWT) on the smoothed differential current signals to obtain a plurality of detail coefficients. In an example, the plurality of detail coefficients may comprise at least a first level, a second level, and a third level of MODWT coefficients. These levels correspond to distinct frequency bands within the signal, with the first level capturing the highest-frequency transients, and the second and third levels capturing progressively lower-frequency components. Each level is extracted for all three phases, enabling capture of both transient and steady-state fault features across the full three-phase system.

In another example, the processor 362 may compute the detail coefficients using an energy-level computation, where the energy level of the differential current measurements is obtained according to equation (1) defined in conjunction with FIG. 3A.

The processor 362 provides observation signals comprising the plurality of detail coefficients, and in some examples the computed energy values, to the DRL agent 366. The observation signals may further comprise an action control signal representative of a previous trip action of the DRL agent 366. The action control signal may be binary, such as 1 for trip and 0 for no-trip, or may be a numerical control parameter. Including the action control signal in the observation vector allows the DRL agent 366 to incorporate temporal dependencies from its prior decision into the current decision.

The DRL agent 366 comprises a temporal convolution attention-based neural network (TCAN) trained using a proximal policy optimization (PPO) method to propose a trip action corresponding to a trip or no-trip command for a fault condition. The DRL agent 366 may be trained based on test observation signals comprising a plurality of test detail coefficients, a test error signal corresponding to a difference between a past test trip action and a reference ground truth signal generated by fault classification logic, a test integrated error representative of a history of past errors, and a test action control signal representative of the past test trip action. The integrated error is computed over time to capture persistent misclassification tendencies. All of these training features are synchronized with the MODWT feature extraction so that time windows align across feature types.

In some examples, simulated noise is added to test current signals for generating the test observation signals during training of the DRL agent 366. The noise may be Gaussian white noise with specified signal-to-noise ratios, such as 20 dB and 30 dB, and is injected into the secondary current measurements before the preprocessing/filtering stage. This ensures that the smoothing stage and the DRL agent are both exposed to realistic noise conditions during training, improving robustness in real-world operation.

The processor 362 may measure the three-phase current signals at a sampling rate of at least 32 samples per cycle, which corresponds to 1.6 kHz for 50 Hz systems and 1.92 kHz for 60 Hz systems. This sampling rate is selected to balance the resolution required for capturing transient fault signatures with the computational requirements for real-time DRL inference.

Responsive to receiving a trip command from the DRL agent 366, the processor 362 transmits a trip signal to the circuit breaker 368. The circuit breaker 368, in response to the trip signal, isolates the protected zone 356 from the rest of the power distribution network 354 to clear the fault.

In an example, the system 352 may be deployed in a medium-voltage feeder between two substations. The local terminals 358 and the remote terminals 360 measure three-phase currents during both normal and fault conditions. Under a high-impedance fault condition with injected noise, the processor 362 preprocesses and smooths the differential current signals using the Savitzky-Golay filter, applies the MODWT to extract the first three levels of detail coefficients, computes per-phase energy features, and forms the observation signals. The DRL agent 366, having been trained with various simulated noise scenarios using the PPO method, accurately determines the presence of a fault and commands the circuit breaker 368 to trip within the required fault-clearing time, outperforming conventional differential protection relays in sensitivity and noise immunity.

In another example, the system 352 may operate in a microgrid with distributed generation sources where bidirectional power flow occurs. The use of the MODWT enables the processor 362 to capture transient wavelet energy from the differential currents, allowing the DRL agent 366 to reliably detect faults even under low-current high-impedance fault scenarios without the need for predefined threshold settings.

In some examples, a method for identifying faults in electrical power distribution systems is provided. The method may involve obtaining three-phase electrical current measurements from both ends of a designated protection area within the power distribution system. The approach may include calculating differential current values from the measured three-phase currents and processing these differential signals through filtering techniques to reduce noise and smooth the waveforms.

The method may apply wavelet decomposition analysis, specifically maximal overlap discrete wavelet transform processing, to the filtered differential current signals to extract multiple levels of detail coefficients that capture different frequency components of the signals. These detail coefficients may include first, second, and third level MODWT coefficients that correspond to various frequency bands within the analyzed signals.

In certain implementations, the method may compute energy levels from the detail coefficients using mathematical relationships where the energy represents the sum of squared MODWT coefficients across multiple decomposition levels. The observation data provided to the analysis system may include these detail coefficients along with additional control signals that represent previous decision states of the fault detection system.

The method may employ a deep reinforcement learning approach utilizing a temporal convolution attention-based neural network architecture that has been trained through proximal policy optimization techniques. This learning system may be configured to analyze the observation signals and determine appropriate protective actions, such as issuing trip commands or maintaining normal operation states.

The training process for the learning system may involve test datasets that include various signal components such as detail coefficients, error signals representing differences between past actions and reference standards, integrated error histories, and previous action control signals. The training may incorporate simulated noise conditions to improve system robustness under realistic operating environments.

The method may operate at specific sampling frequencies, such as at least 32 samples per electrical cycle, to capture sufficient signal detail for accurate fault detection. The differential current processing may utilize specific filtering approaches, such as Savitzky-Golay filtering techniques, to maintain signal integrity while reducing unwanted noise components.

Upon determining that a fault condition exists, the method may generate and transmit protective signals to circuit interruption devices to isolate the affected network section. The temporal convolution attention-based neural network may incorporate various architectural elements including sequence processing layers, positional encoding components, self-attention mechanisms, and multiple temporal convolution blocks with configurable parameters such as dilation factors, normalization stages, dropout mechanisms, and activation functions.

The differential current calculations may represent vector summations of all current flows entering the protected network zone, providing a comprehensive view of the electrical conditions within the monitored area.

Figure 4:
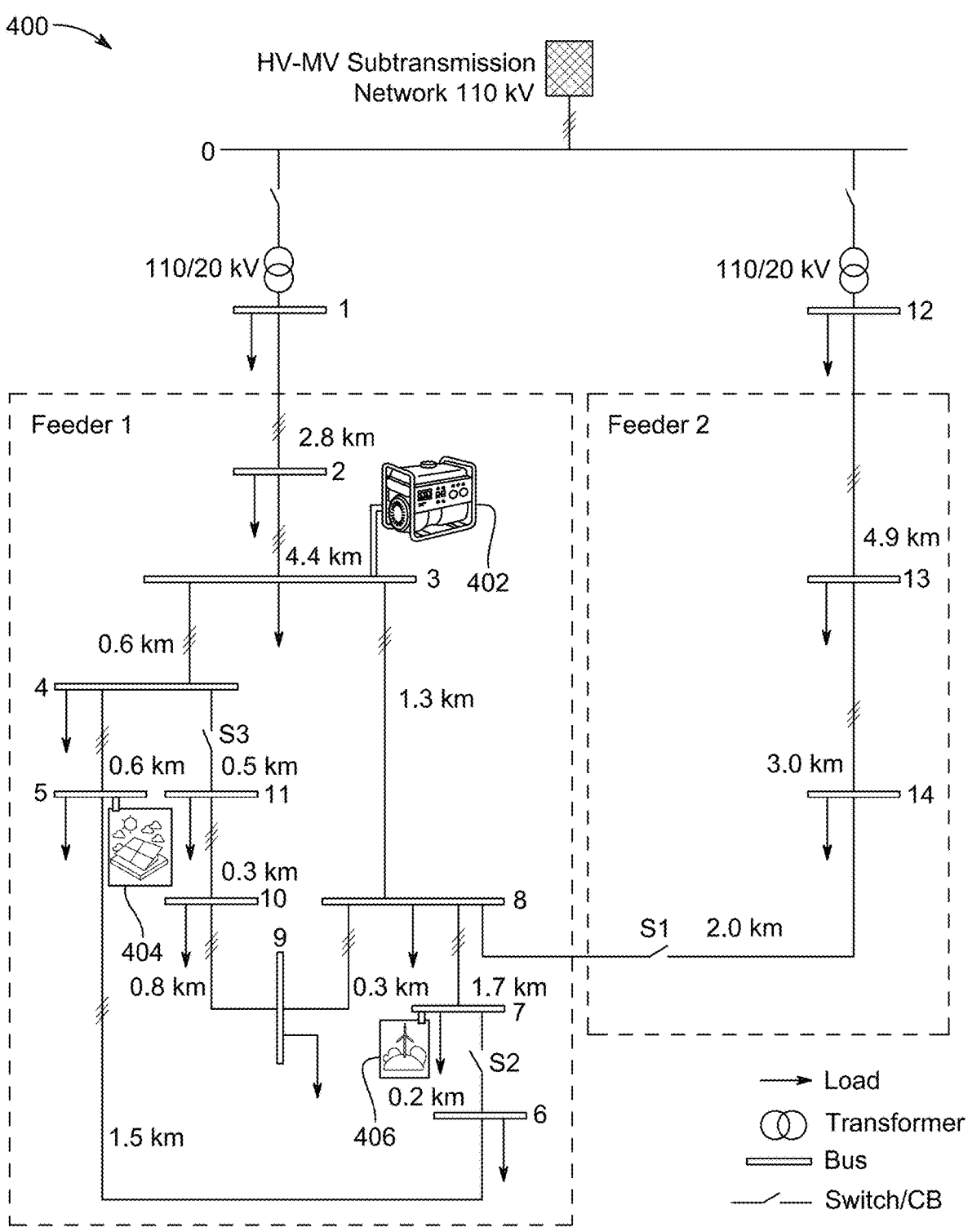
FIG. 4 is a sketch illustrating a modified CIGRE European MV distribution network, according to aspects of the present disclosure.

FIG. 4 illustrates an example of distribution network 400 representing a medium-voltage (MV) distribution system connected to a high-voltage to medium-voltage (HV-MV) subtransmission network rated at 110 kV. The HV-MV subtransmission network is coupled through 110/20 kV transformers to two feeders, identified as Feeder 1 and Feeder 2, each supplying multiple loads and incorporating multiple switchgear and circuit breaker devices.

Feeder 1 includes a series of interconnected buses, switches, and loads. At the upstream connection, Feeder 1 is connected to the HV-MV subtransmission network 110 kV through a 110/20 kV transformer. Downstream of this transformer, a bus is located at position 1, feeding multiple branches. The first branch from bus 1 extends 0.6 km to a branch containing load 404, with an intervening switch S3. The load 404 represents a distributed generation (DG) resource, which may be, for example, a solar photovoltaic (PV) plant connected at medium voltage. The network segment from switch S3 extends 0.6 km to bus 11 and a further 0.3 km to bus 5, which connects to another feeder segment.

From bus 1, a primary path extends 2.8 km to bus 3, where load 402 is connected. Load 402 represents a distributed generation source such as a diesel generator rated at 5.5 MVA. From bus 3, a branch extends 4.4 km further downstream to connect additional loads and segments of the feeder. Another branch from bus 3 extends 1.3 km to bus 8.

Bus 8 serves as a key interconnection point, linking to multiple downstream branches. One branch extends 0.8 km to bus 7, which is connected via switch S2 to bus 6. From bus 6, a short 0.2 km segment connects to load 406. Load 406 represents a distributed generation source such as a wind turbine rated at 1.5 MVA. Another branch from bus 8 connects upstream to bus 5 over a 0.3 km section, providing a parallel path to the earlier branch from bus 11.

Feeder 2 is similarly connected to the HV-MV subtransmission network 110 kV via a 110/20 kV transformer feeding bus 12. Downstream, Feeder 2 includes buses 13 and 14, located 4.9 km and 3.0 km from bus 12, respectively. These buses connect to load points and may be integrated with distributed generation sources. Bus 14 connects to bus 1 of Feeder 1 through switch S1 over a 2.0 km section, allowing interconnection between the two feeders for operational flexibility and redundancy.

The distribution network 400 includes a combination of radial and loop configurations enabled by the sectionalizing switches S1, S2, and S3, which can be operated to reconfigure power flow paths. The distances between buses are annotated to indicate the lengths of distribution line segments, which are relevant for calculating impedance, fault location, and for simulating network operating scenarios.

The network 400 is representative of a modified CIGRE European MV distribution benchmark model, as used for simulation and testing of the fault detection and classification system described in FIGS. 1-3. In such a simulation environment, faults are applied at various locations along the feeder lines between buses, including between bus 5 and bus 6, and between other selected buses. Fault resistances may be varied over a wide range, including low resistance values (e.g., 0.001Ω) and high impedance values (e.g., 1000Ω), to evaluate system performance.

In one example, the system 352 described in FIG. 3B may be deployed at a substation controlling Feeder 1, with local terminals connected at bus 1 and remote terminals connected at bus 6 or bus 14, depending on the protection zone configuration. The three-phase current measurements from both ends of the protected zone are used to compute differential currents, apply MODWT analysis, and form observation vectors for the DRL agent, as described in FIGS. 1-3. The configuration shown in FIG. 4 allows for both grid-connected and islanded operation modes by controlling the sectionalizing switches and distributed generation sources, enabling comprehensive testing of the proposed fault detection scheme under varied operating conditions, including bidirectional power flow.

In another example, load 404 (solar PV), load 406 (wind turbine), and load 402 (diesel generator) provide a realistic distributed energy resource (DER) mix for evaluating the system's sensitivity to faults with dynamic generation sources. These DERs contribute to changing fault current magnitudes and waveforms, challenging conventional protection methods. The proposed TCAN PPO agent-based differential protection method is evaluated in this network to demonstrate improved detection speed, accuracy, and robustness in the presence of such complexities.

Figure 5:
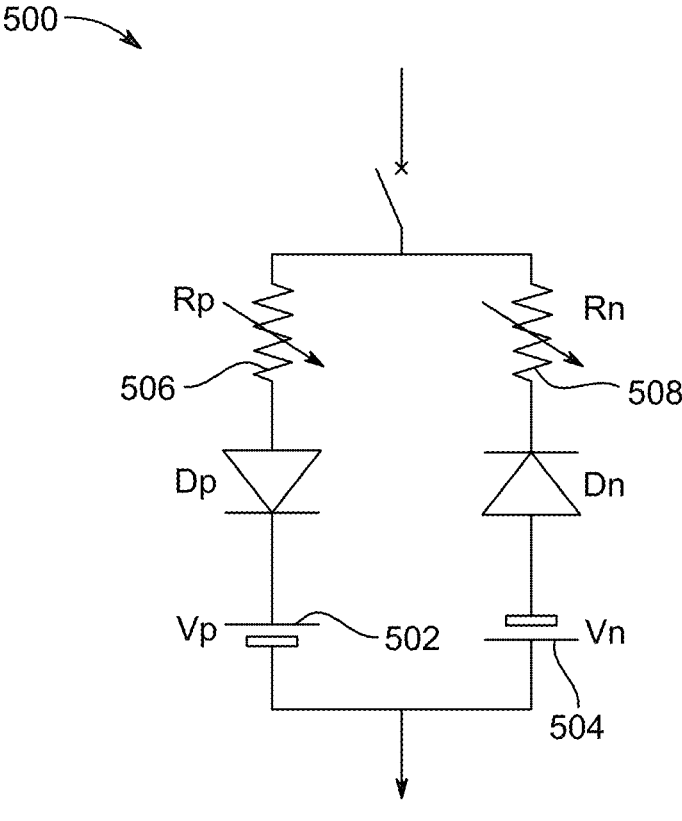
FIG. 5 is a schematic diagram illustrating a high impedance fault model circuit, according to aspects of the present disclosure.

FIG. 5 illustrates an example of two-diode high impedance fault (HIF) model 500 used for simulating HIF scenarios in an electric power distribution network. The HIF model 500 is configured to replicate the electrical characteristics of a high impedance fault between an overhead power conductor and a high impedance surface, such as dry soil, sand, or vegetation.

The HIF model 500 includes a positive DC voltage source 502 (Vp) and a negative DC voltage source 504 (Vn), each representing the arc voltage characteristics of a fault in the positive and negative half-cycles of the power waveform, respectively. The positive DC voltage source 502 is connected in series with a diode Dp and a variable resistor Rp 506, while the negative DC voltage source 504 is connected in series with a diode Dn and a variable resistor Rn 508. The diodes Dp and Dn represent the unidirectional conduction of current during the respective half-cycles of the AC waveform, ensuring that each branch of the model conducts only during its corresponding polarity.

In an example configuration, the positive DC voltage source Vp is set to 8 kV with a random variation of ±10%, while the negative DC voltage source Vn is set to 5 kV with a random variation of ±10%. The variable resistors Rp and Rn are independently set to values within a range of 550Ω to 605Ω, with random variation to reflect the stochastic nature of arcing fault contact resistance. These parameters are selected to reproduce the asymmetry typically observed in HIF current waveforms due to differences in positive and negative half-cycle conduction.

During simulation, the HIF model 500 produces fault currents with low magnitude, high distortion, and asymmetrical waveforms, closely matching the observed characteristics of real-world high impedance faults. These waveforms typically include intermittent conduction, sudden current drops, and non-linear behavior caused by arc extinction and re-ignition.

In the context of the system 352 described in FIG. 3B and the network 400 shown in FIG. 4, the HIF model 500 is connected at selected fault points in the distribution network to generate test scenarios for both training and evaluation of the fault detection scheme. The model can be applied to simulate various ground fault types, including single-line-to-ground (LG), double-line-to-ground (LLG), and three-phase-to-ground (LLLG) faults, under both grid-connected and islanded operating conditions. The simulation duration is typically set to 0.4 seconds, with the fault introduced at 0.2 seconds into the simulation.

The use of the two-diode HIF model 500 enables generation of realistic training data for the deep reinforcement learning (DRL) agent described in FIG. 3B. By introducing random variation in the parameters Vp, Vn, Rp, and Rn, a wide range of HIF signatures can be captured, improving the generalization capability of the DRL agent in real-time deployment. The model's simplicity also ensures computational efficiency, allowing it to be used in large-scale simulation studies and hardware-in-the-loop (HIL) testing environments, as described in the disclosure.

Figure 6:
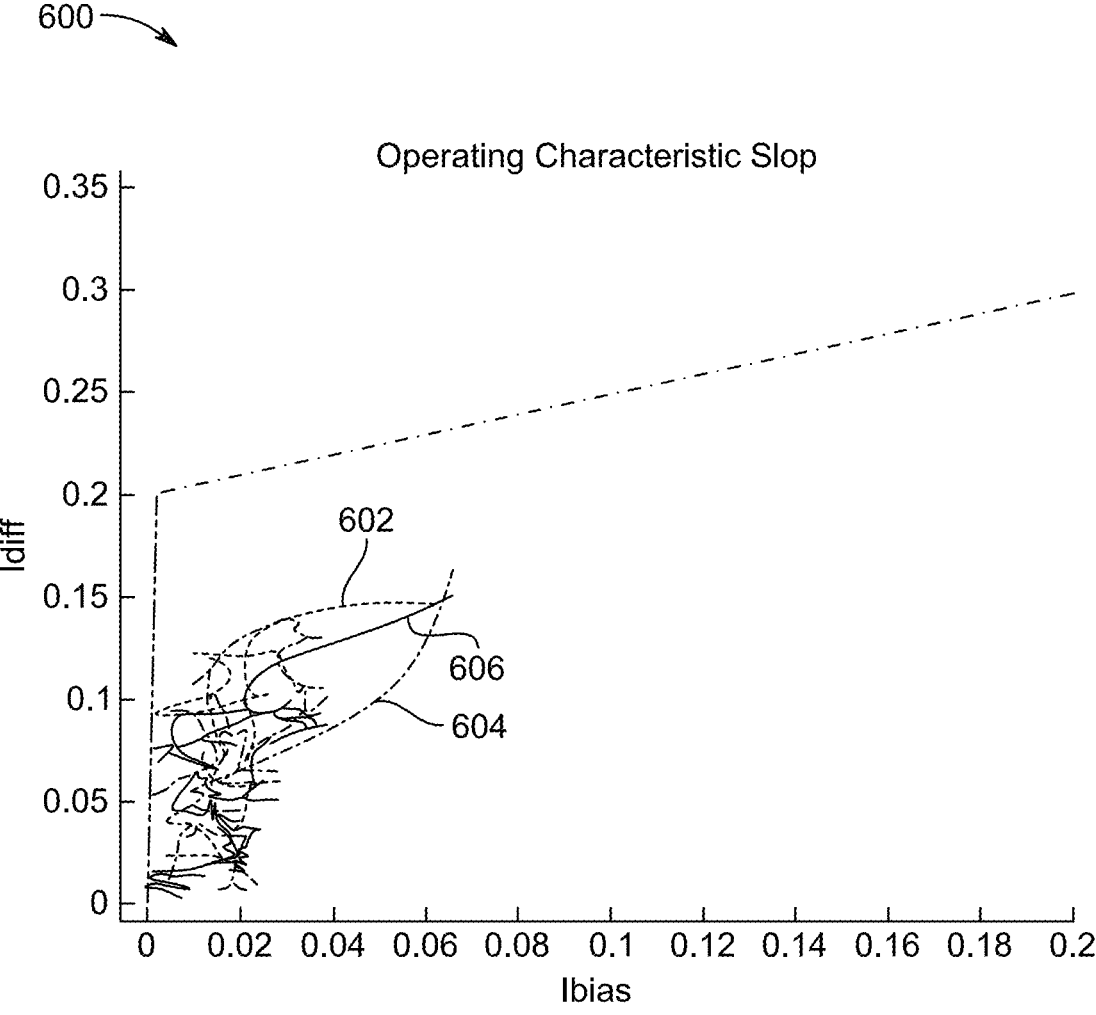
FIG. 6 is a graph illustrating an operating characteristic slope showing differential current relationships, according to aspects of the present disclosure.

FIG. 6 illustrates a graph 600 showing an example high impedance fault (HIF) current trajectory in differential relay characteristics for a three-phase protected zone of an electric power distribution network. The graph 600 plots the differential current magnitude (Idiff) on the vertical axis against the bias current magnitude (Ibias) on the horizontal axis. These quantities are derived from the three-phase current measurements obtained at the local terminals and remote terminals of the protected zone, as described in FIG. 3B.

The graph 600 includes operating characteristic lines corresponding to the conventional biased differential protection slope. The slope defines the relay's tripping region, where the differential current exceeds a threshold determined as a function of the bias current. The horizontal portion of the slope represents the minimum pickup current, while the inclined portion represents the percentage bias region that increases the operating threshold with increasing bias current to maintain stability during external faults and CT mismatch conditions.

In FIG. 6, the trajectories 602, 604, and 606 represent the Idiff versus Ibias paths for phases A, B, and C, respectively, during an HIF event. These trajectories are generated using simulated HIF current waveforms obtained from the two-diode HIF model 500 described in FIG. 5, applied to a location in the distribution network 400 shown in FIG. 4. The simulation results demonstrate that, for the HIF condition, the differential currents for all three phases remain below the operating characteristic slope throughout the event duration.

This behavior reflects a key limitation of conventional biased differential protection: when the HIF current magnitude is low due to high fault resistance and arc characteristics, the relay operating point does not enter the tripping region, and therefore no trip command is issued. The fault remains undetected, leading to potential safety hazards and prolonged fault conditions in the network.

The system 352 described in FIG. 3B addresses this limitation by preprocessing the measured currents, applying maximal overlap discrete wavelet transform (MODWT) analysis to extract detail coefficients, and forming observation signals for the deep reinforcement learning (DRL) agent. The DRL agent, using the TCAN PPO architecture described in FIG. 2 and the training methodology outlined in FIG. 3, can detect such HIF scenarios even when the operating point stays outside the conventional tripping characteristic shown in FIG. 6. This enables accurate detection and faster isolation of faults that would otherwise bypass traditional protection methods.

Figure 7:
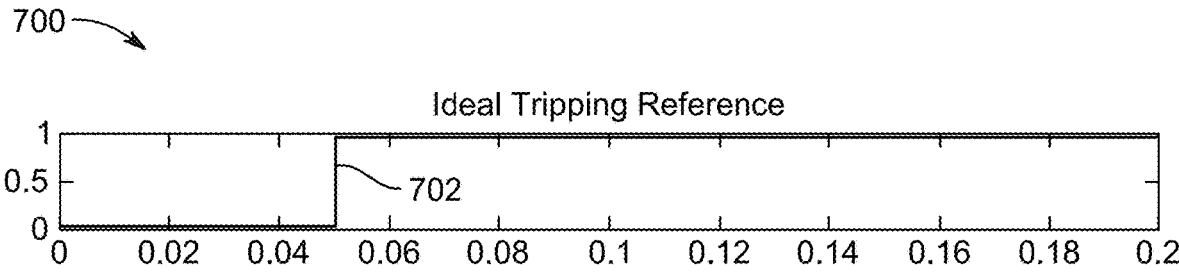
FIG. 7 is a sketch illustrating timing diagrams showing tripping behavior for different protection schemes, according to aspects of the present disclosure.
Figure 7:
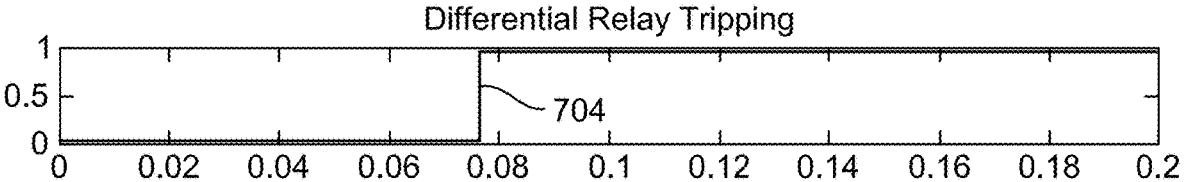
Figure 7:
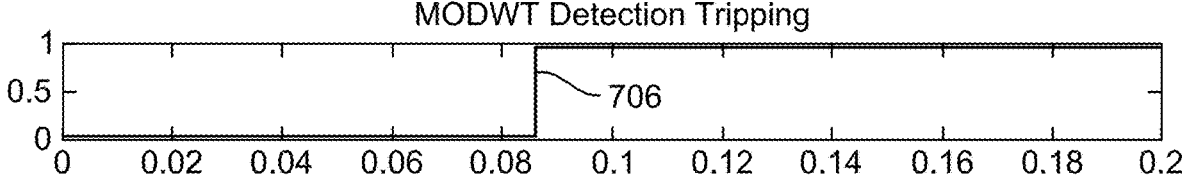
Figure 7:
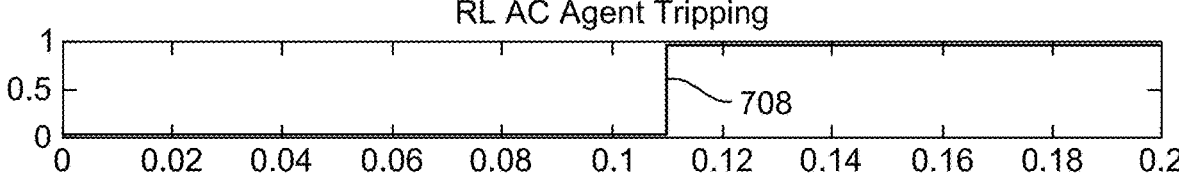
Figure 7:
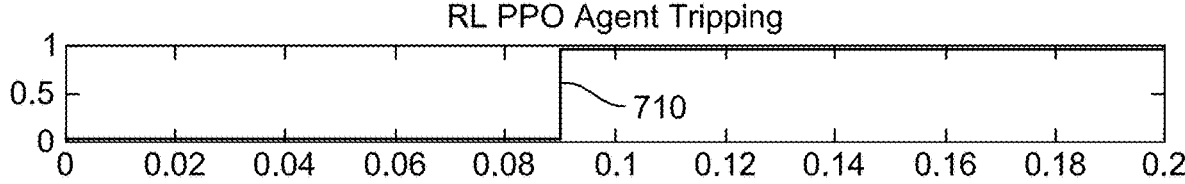

FIG. 7 illustrates a sample 700 of tripping behaviors for a plurality of models operating in a grid-connected mode under a fault condition in an electric power distribution network. The horizontal axis in each sub-plot represents time in seconds, and the vertical axis represents the trip command state, where a value of "1" indicates a trip command and a value of "0" indicates no-trip. The plots compare the tripping response times of different detection schemes relative to an ideal tripping reference.

The first plot 702, labeled Ideal tripping Reference, represents the idealized trip command timing for the fault scenario. This signal transitions from 0 to 1 at the earliest possible moment when the fault is detected, representing the optimal fault-clearing response with no delay.

The second plot 704, labeled Differential relay tripping, corresponds to the trip signal generated by a conventional biased differential protection relay using the local terminals and remote terminals current measurements of the protected zone (see FIG. 3B). As observed, the conventional relay trips after a delay relative to the ideal reference, and in certain high impedance fault scenarios, such a relay may fail to trip entirely (as demonstrated in FIG. 6).

The third plot 706, labeled MODWT detection tripping, shows the trip behavior of a fault detection scheme using the maximal overlap discrete wavelet transform (MODWT) applied to the differential current signals. This method improves detection sensitivity compared to the conventional relay by analyzing transient energy content in selected wavelet detail coefficients, but still shows a measurable delay relative to the ideal tripping reference.

The fourth plot 708, labeled RL AC agent tripping, corresponds to a deep reinforcement learning (DRL) agent implementing an actor-critic (AC) method using the temporal convolution attention-based neural network (TCAN) architecture. The observation signals provided to this agent comprise MODWT detail coefficients, an error signal, an integrated error signal, and an action control signal representative of the previous trip action. The AC agent's trip timing shows improvement in fault detection speed compared to the MODWT-only scheme, with earlier tripping closer to the ideal reference.

The fifth plot 710, labeled RL PPO agent tripping, corresponds to the DRL agent trained using the proximal policy optimization (PPO) method with the TCAN architecture, as described in FIG. 2 and FIG. 3. The PPO agent uses the same set of observation signals as the AC agent, with training conducted under varying fault resistance values and simulated noise levels (e.g., 20 dB and 30 dB Gaussian white noise). The PPO agent's trip timing in this scenario is closest to the ideal tripping reference, demonstrating the model's capability to detect and respond to faults rapidly and with high reliability.

The comparative results in FIG. 7 show that the DRL PPO agent offers superior performance in terms of fault detection speed and accuracy in a grid-connected mode, outperforming conventional differential protection and MODWT-only detection. This performance advantage is achieved while maintaining robustness under noise-injected scenarios, as established in the training data generated using the distribution network model of FIG. 4 and the high impedance fault model of FIG. 5.

The performance evaluation of the proposed system for diagnosing faults in an electric power distribution network was carried out using both offline simulation and real-time hardware-in-the-loop (HIL) testing. The simulation platform implemented a modified CIGRE European MV distribution network model, as shown in FIG. 4, rated at 20 kV and connected to a 110 kV subtransmission network via 110/20 kV transformers. The network topology supports multiple feeders, distributed generation (DG) sources, and sectionalizing switches to enable both grid-connected and islanded modes.

Fault scenarios were simulated at various locations across the network, including between buses within the protected zone and at external network points. The fault types tested include single-line-to-ground (LG), line-to-line (LL), double-line-to-ground (LLG), and three-phase-to-ground (LLLG) faults. Low-resistance faults (LRF) were simulated at values such as 0.001Ω and 1Ω, while high-resistance faults (HRF) included resistances up to 1000Ω. High impedance faults (HIF) were modeled using the two-diode HIF model of FIG. 5, with parameters Vp, Vn, Rp, and Rn varied randomly within specified ranges to produce realistic asymmetric fault current waveforms.

All simulations were executed for a duration of 0.4 seconds, with fault inception at 0.2 seconds. The sampling rate was set to at least 32 samples per cycle, equivalent to 1.6 kHz for 50 Hz systems and 1.92 kHz for 60 Hz systems. Gaussian white noise at 20 dB and 30 dB signal-to-noise ratios was injected into the secondary current measurements in certain scenarios to evaluate noise robustness.

The DRL PPO and DRL AC agents, both implementing the TCAN architecture of FIG. 2, were trained using observation signals comprising MODWT detail coefficients, per-phase wavelet energy levels, error signal, integrated error signal, and action control signal representing the previous trip action. Hyperparameters were as in Table I. Training was conducted with an 80/20 split between training and validation datasets, and the models were evaluated using unseen test scenarios.

HIL validation employed an RTDS platform replicating the network topology, protection zones, and operating conditions, enabling real-time verification of detection accuracy, classification accuracy, and tripping time performance under both grid-connected and islanded modes.

Table I, provided below, lists the hyperparameters used for training the actor-critic (AC) and proximal policy optimization (PPO) deep reinforcement learning agents with the TCAN architecture, where the sample time was set to 0.01 seconds (100 Hz step resolution), the number of steps ahead was tuned for predictive stability, the discount factor controlled reward prioritization, the critic learning rate and actor learning rate determined convergence speed, the experience buffer length managed historical observation retention, the PPO clipping parameter maintained policy stability, and the batch size determined gradient update frequency. These values were optimized to balance training speed and stability, enabling effective detection of low- and high-resistance faults as well as HIFs under both noise-free and noise-injected conditions.

TABLE I

| Hyperparameters for DRL Agent Training | |
|---|---|
| Hyperparameter | Value |
| Sample time | 0.01 seconds |
| Number of steps ahead | 5 |
| Discount factor ($\gamma$) | 0.99 |
| Critic learning rate | 0.001 |
| Actor learning rate | 0.0003 |
| Experience buffer length | 10,000 samples |
| PPO clipping parameter ($\varepsilon$) | 0.2 |
| Batch size | 64 |

Table II, provided below, summarizes the detection security and accuracy for all evaluated models under normal operating conditions with no faults. Tests were performed in both grid-connected and islanded modes, under noise-free conditions and with Gaussian white noise injection at 20 dB and 30 dB. All models avoided false trips, with RL PPO and RL AC agents maintaining 100% security in every case, validating their immunity to non-fault switching events such as load changes and capacitor bank energization.

TABLE II

| Detection Security Under Normal Operating Conditions (No Faults) | | | | | |
|---|---|---|---|---|---|
| Operating Mode | Noise Condition | Differential Relay | MODWT Detection | RL AC Agent | RL PPO Agent |
| Grid-connected | No noise | No trip (100%) | No trip (100%) | No trip (100%) | No trip (100%) |
| | 20 dB SNR | No trip (100%) | No trip (100%) | No trip (100%) | No trip (100%) |
| | 30 dB SNR | No trip (100%) | No trip (100%) | No trip (100%) | No trip (100%) |
| Islanded | No noise | No trip (100%) | No trip (100%) | No trip (100%) | No trip (100%) |
| | 20 dB SNR | No trip (100%) | No trip (100%) | No trip (100%) | No trip (100%) |
| | 30 dB SNR | No trip (100%) | No trip (100%) | No trip (100%) | No trip (100%) |

Table III, provided below, presents the tripping behavior of the detection models during capacitor bank switching events. Scenarios were tested in both grid-connected and islanded modes, with and without noise injection. The absence of tripping across all detection methods confirms stability against switching-induced transients.

TABLE III

| Tripping Behavior During Capacitor Bank Switching Events | | | | | |
|---|---|---|---|---|---|
| Operating Mode | Noise Condition | Differential Relay | MODWT Detection | RL AC Agent | RL PPO Agent |
| Grid-connected | No noise | No trip | No trip | No trip | No trip |
| | 20 dB SNR | No trip | No trip | No trip | No trip |
| | 30 dB SNR | No trip | No trip | No trip | No trip |
| Islanded | No noise | No trip | No trip | No trip | No trip |
| | 20 dB SNR | No trip | No trip | No trip | No trip |
| | 30 dB SNR | No trip | No trip | No trip | No trip |

Table IV, provided below, shows the tripping responses of the detection models during load switching at Bus 5 and Bus 6 in both grid-connected and islanded modes. No trip commands were issued in any scenario, demonstrating that the proposed DRL PPO agent preserves security under load variation events.

TABLE IV

| Tripping Behavior During Load Switching Events | | | | | |
|---|---|---|---|---|---|
| Operating Mode | Bus Location | Differential Relay | MODWT Detection | RL AC Agent | RL PPO Agent |
| Grid-connected | Bus 5 | No trip | No trip | No trip | No trip |
| | Bus 6 | No trip | No trip | No trip | No trip |
| Islanded | Bus 5 | No trip | No trip | No trip | No trip |
| | Bus 6 | No trip | No trip | No trip | No trip |

Table V, provided below, compares detection accuracy for LG, LL, LLG, and LLLG faults at varying resistance levels and under noise conditions of 20 dB and 30 dB. The RL PPO agent achieved 100% detection in all conditions, while the conventional differential relay failed in high-resistance cases and MODWT-only detection showed reduced accuracy in noisy cases.

TABLE V

Fault Detection Accuracy by Fault Type and Resistance

| Fault Type | Fault Resistance (Ω) | Noise Condition | Differential Relay | MODWT Detection | RL AC Agent | RL PPO Agent |
|---|---|---|---|---|---|---|
| LG | 0.001 | No noise | 100% | 100% | 100% | 100% |
| | | 30 dB SNR | 100% | 98% | 100% | 100% |
| | 100 | No noise | 85% | 100% | 100% | 100% |
| | | 30 dB SNR | 80% | 95% | 100% | 100% |
| | 1000 | No noise | 0% | 95% | 100% | 100% |
| | | 30 dB SNR | 0% | 90% | 98% | 100% |
| LL | 0.001 | No noise | 100% | 100% | 100% | 100% |
| | | 30 dB SNR | 100% | 98% | 100% | 100% |
| | 100 | No noise | 90% | 100% | 100% | 100% |
| | | 30 dB SNR | 85% | 95% | 100% | 100% |
| | 1000 | No noise | 0% | 95% | 100% | 100% |
| | | 30 dB SNR | 0% | 90% | 98% | 100% |
| LLG | 0.001 | No noise | 100% | 100% | 100% | 100% |
| | | 30 dB SNR | 100% | 98% | 100% | 100% |
| | 100 | No noise | 95% | 100% | 100% | 100% |
| | | 30 dB SNR | 90% | 95% | 100% | 100% |
| | 1000 | No noise | 0% | 95% | 100% | 100% |
| | | 30 dB SNR | 0% | 90% | 98% | 100% |
| LLLG | 0.001 | No noise | 100% | 100% | 100% | 100% |
| | | 30 dB SNR | 100% | 98% | 100% | 100% |
| | 100 | No noise | 95% | 100% | 100% | 100% |
| | | 30 dB SNR | 90% | 95% | 100% | 100% |
| | 1000 | No noise | 0% | 95% | 100% | 100% |
| | | 30 dB SNR | 0% | 90% | 98% | 100% |

Table VI, provided below, lists tripping times for resistive faults in both the CIGRE MV and IEEE-14 network models. The RL PPO agent consistently achieved faster or comparable tripping times to the ideal reference, and successfully detected faults undetected by conventional relays, especially at higher fault resistances.

TABLE VI

Tripping Times for Resistive Faults in Different Network Models

| Network Model | Fault Type | Fault Resistance (Ω) | Ideal Reference (ms) | Differential Relay (ms) | MODWT Detection (ms) | RL AC Agent (ms) | RL PPO Agent (ms) |
|---|---|---|---|---|---|---|---|
| CIGREMV | LG | 0.001 | 20.0 | 25.5 | 22.8 | 21.5 | 20.2 |
| | | 100 | 20.0 | 35.2 | 24.6 | 22.3 | 20.5 |
| | | 1000 | 20.0 | No trip | 28.7 | 23.8 | 21.2 |
| | LL | 0.001 | 20.0 | 24.8 | 22.5 | 21.2 | 20.1 |
| | | 100 | 20.0 | 33.6 | 24.2 | 22.0 | 20.4 |
| | | 1000 | 20.0 | No trip | 28.3 | 23.5 | 21.0 |
| | LLLG | 0.001 | 20.0 | 23.5 | 21.8 | 20.8 | 20.0 |
| | | 100 | 20.0 | 32.0 | 23.5 | 21.5 | 20.2 |
| | | 1000 | 20.0 | No trip | 27.2 | 22.8 | 20.8 |
| IEEE-14 | LG | 0.001 | 20.0 | 26.2 | 23.5 | 22.0 | 20.5 |
| | | 100 | 20.0 | 36.8 | 25.2 | 22.8 | 20.8 |
| | | 1000 | 20.0 | No trip | 29.5 | 24.2 | 21.5 |
| | LL | 0.001 | 20.0 | 25.5 | 23.0 | 21.8 | 20.3 |
| | | 100 | 20.0 | 35.0 | 24.8 | 22.5 | 20.6 |
| | | 1000 | 20.0 | No trip | 29.0 | 24.0 | 21.2 |
| | LLLG | 0.001 | 20.0 | 24.2 | 22.5 | 21.2 | 20.1 |
| | | 100 | 20.0 | 33.5 | 24.0 | 22.0 | 20.4 |
| | | 1000 | 20.0 | No trip | 28.0 | 23.2 | 21.0 |

Table VII, provided below, details low- and high-resistance fault classification in grid-connected mode, with resistance values spanning 0.001Ω to 1000Ω. The RL PPO agent achieved correct classification in all scenarios.

TABLE VII

Fault Classification in Grid-Connected Mode

| Fault Type | Fault Resistance (Ω) | Differential Relay | MODWT Detection | RL AC Agent | RL PPO Agent |
|---|---|---|---|---|---|
| LG (Phase A) | 0.001 | Correct | Correct | Correct | Correct |
| | 100 | Correct | Correct | Correct | Correct |
| | 1000 | No detection | Correct | Correct | Correct |
| LL (Phases A-B) | 0.001 | Correct | Correct | Correct | Correct |
| | 100 | Correct | Correct | Correct | Correct |
| | 1000 | No detection | Correct | Correct | Correct |
| LLG (Phases B-C) | 0.001 | Correct | Correct | Correct | Correct |
| | 100 | Correct | Correct | Correct | Correct |
| | 1000 | No detection | Correct | Correct | Correct |
| LLLG | 0.001 | Correct | Correct | Correct | Correct |
| | 100 | Correct | Correct | Correct | Correct |
| | 1000 | No detection | Correct | Correct | Correct |

Table VIII, provided below, contains the same classification analysis as Table VII but under island mode operation. The RL PPO agent maintained 100% classification accuracy across all tested resistance values.

TABLE VIII

Fault Classification in Island Mode

| Fault Type | Fault Resistance (Ω) | Differential Relay | MODWT Detection | RL AC Agent | RL PPO Agent |
|---|---|---|---|---|---|
| LG (Phase A) | 0.001 | Correct | Correct | Correct | Correct |
| | 100 | Correct | Correct | Correct | Correct |
| | 1000 | No detection | Correct | Correct | Correct |
| LL (Phases A-B) | 0.001 | Correct | Correct | Correct | Correct |
| | 100 | Correct | Correct | Correct | Correct |
| | 1000 | No detection | Correct | Correct | Correct |

TABLE VIII-continued

| | | Fault Classification in Island Mode | | | |
|---|---|---|---|---|---|
| Fault Type | Fault Resistance (Ω) | Differential Relay | MODWT Detection | RL AC Agent | RL PPO Agent |
| LLG | 0.001 | Correct | Correct | Correct | Correct |
| (Phases | 100 | Correct | Correct | Correct | Correct |
| B-C) | 1000 | No detection | Correct | Correct | Correct |

TABLE VIII-continued

| | | Fault Classification in Island Mode | | | |
|---|---|---|---|---|---|
| Fault Type | Fault Resistance (Ω) | Differential Relay | MODWT Detection | RL AC Agent | RL PPO Agent |
| LLLG | 0.001 | Correct | Correct | Correct | Correct |
| | 100 | Correct | Correct | Correct | Correct |
| | 1000 | No detection | Correct | Correct | Correct |

Table IX, provided below, presents classification performance for HIFs modeled using FIG. 5's two-diode structure in grid-connected mode, with parameters Vp, Vn, Rp, and Rn varied randomly. The RL PPO agent detected all HIF cases, including high-resistance HIFs that conventional relays missed.

TABLE IX

| | HIF Classification in Grid-Connected Mode | | | | |
|---|---|---|---|---|---|
| Fault Type | HIF Parameters | Differential Relay | MODWT Detection | RL AC Agent | RL PPO Agent |
| LG (Phase A) | Vp = 8 kV, Vn = 5 kV, Rp = 550 Ω, Rn = 550 Ω | No detection | Correct | Correct | Correct |
| | Vp = 8.5 kV, Vn = 5.2 kV, Rp = 575 Ω, Rn = 580 Ω | No detection | Correct | Correct | Correct |
| | Vp = 7.8 kV, Vn = 4.8 kV, Rp = 600 Ω, Rn = 605 Ω | No detection | Correct | Correct | Correct |
| LG (Phase B) | Vp = 8 kV, Vn = 5 kV, Rp = 550 Ω, Rn = 550 Ω | No detection | Correct | Correct | Correct |
| | Vp = 8.5 kV, Vn = 5.2 kV, Rp = 575 Ω, Rn = 580 Ω | No detection | Correct | Correct | Correct |
| | Vp = 7.8 kV, Vn = 4.8 kV, Rp = 600 Ω, Rn = 605 Ω | No detection | Correct | Correct | Correct |
| LG (Phase C) | Vp = 8 kV, Vn = 5 kV, Rp = 550 Ω, Rn = 550 Ω | No detection | Correct | Correct | Correct |
| | Vp = 8.5 kV, Vn = 5.2 kV, Rp = 575 Ω, Rn = 580 Ω | No detection | Correct | Correct | Correct |
| | Vp = 7.8 kV, Vn = 4.8 kV, Rp = 600 Ω, Rn = 605 Ω | No detection | Correct | Correct | Correct |

Table X, provided below, mirrors the conditions of Table IX but in island mode. The RL PPO agent retained full detection capability across all HIF parameter variations.

TABLE X

| | HIF Classification in Island Mode | | | | |
|---|---|---|---|---|---|
| Fault Type | HIF Parameters | Differential Relay | MODWT Detection | RL AC Agent | RL PPO Agent |
| LG (Phase A) | Vp = 8 kV, Vn = 5 kV, Rp = 550 Ω, Rn = 550 Ω | No detection | Correct | Correct | Correct |
| | Vp = 8.5 kV, Vn = 5.2 kV, Rp = 575 Ω, Rn = 580 Ω | No detection | Correct | Correct | Correct |
| | Vp = 7.8 kV, Vn = 4.8 kV, Rp = 600 Ω, Rn = 605 Ω | No detection | Correct | Correct | Correct |
| LG (Phase B) | Vp = 8 kV, Vn = 5 kV, Rp = 550 Ω, Rn = 550 Ω | No detection | Correct | Correct | Correct |
| | Vp = 8.5 kV, Vn = 5.2 kV, Rp = 575 Ω, Rn = 580 Ω | No detection | Correct | Correct | Correct |
| | Vp = 7.8 kV, Vn = 4.8 kV, Rp = 600 Ω, Rn = 605 Ω | No detection | Correct | Correct | Correct |
| LG (Phase C) | Vp = 8 kV, Vn = 5 kV, Rp = 550 Ω, Rn = 550 Ω | No detection | Correct | Correct | Correct |
| | Vp = 8.5 kV, Vn = 5.2 kV, Rp = 575 Ω, Rn = 580 Ω | No detection | Correct | Correct | Correct |
| | Vp-7.8 kV, Vn = 4.8 kV, Rp = 600 Ω, Rn = 605 Ω | No detection | Correct | Correct | Correct |

Table XI, provided below, shows results for external faults at Bus 6, outside the protected zone. The PPO agent correctly refrained from tripping in every case, demonstrating proper zone selectivity.

TABLE XI

| | External Fault Detection at Bus 6 (Grid-Connected Mode) | | | | |
|---|---|---|---|---|---|
| Fault Type | Fault Resistance (Ω) | Differential Relay | MODWT Detection | RL AC Agent | RL PPO Agent |
| LG | 0.001 | No trip | No trip | No trip | No trip |
| | 100 | No trip | No trip | No trip | No trip |
| | 1000 | No trip | No trip | No trip | No trip |
| LL | 0.001 | No trip | No trip | No trip | No trip |
| | 100 | No trip | No trip | No trip | No trip |
| | 1000 | No trip | No trip | No trip | No trip |
| LLLG | 0.001 | No trip | No trip | No trip | No trip |
| | 100 | No trip | No trip | No trip | No trip |
| | 1000 | No trip | No trip | No trip | No trip |

Table XII, provided below, contains results for external faults in islanded mode on Bus 5. No trips were recorded for the PPO agent, matching correct discrimination behavior.

TABLE XII

| | External Fault Detection at Bus 5 (Island Mode) | | | | |
|---|---|---|---|---|---|
| Fault Type | Fault Resistance (Ω) | Differential Relay | MODWT Detection | RL AC Agent | RL PPO Agent |
| LG | 0.001 | No trip | No trip | No trip | No trip |
| | 100 | No trip | No trip | No trip | No trip |
| | 1000 | No trip | No trip | No trip | No trip |
| LL | 0.001 | No trip | No trip | No trip | No trip |
| | 100 | No trip | No trip | No trip | No trip |
| | 1000 | No trip | No trip | No trip | No trip |
| LLLG | 0.001 | No trip | No trip | No trip | No trip |
| | 100 | No trip | No trip | No trip | No trip |
| | 1000 | No trip | No trip | No trip | No trip |

Table XIII, provided below, lists trip times for resistive faults in grid-connected mode from both simulation and HIL RTDS testing, with specific bus locations indicated. The PPO agent tripped successfully for all resistances, including those undetected by conventional relays.

TABLE XIII

| | | Trip Times for Resistive Faults in Grid-Connected Mode (Simulation vs. HIL) | | | | |
|---|---|---|---|---|---|---|
| Fault Location | Fault Type | Fault Resistance (Ω) | Test Environment | Differential Relay (ms) | MODWT Detection (ms) | RL PPO Agent (ms) |
| Between Bus 5-6 | LG (Phase A) | 0.001 | Simulation | 25.5 | 22.8 | 20.2 |
| | | | HIL RTDS | 26.2 | 23.5 | 20.8 |
| | | 100 | Simulation | 35.2 | 24.6 | 20.5 |
| | | | HIL RTDS | 36.5 | 25.2 | 21.0 |
| | | 1000 | Simulation | No trip | 28.7 | 21.2 |
| | | | HIL RTDS | No trip | 29.5 | 21.8 |
| Between Bus 3-8 | LL (Phases A-B) | 0.001 | Simulation | 24.8 | 22.5 | 20.1 |
| | | | HIL RTDS | 25.5 | 23.0 | 20.5 |
| | | 100 | Simulation | 33.6 | 24.2 | 20.4 |
| | | | HIL RTDS | 34.8 | 24.8 | 20.8 |
| | | 1000 | Simulation | No trip | 28.3 | 21.0 |
| | | | HIL RTDS | No trip | 29.0 | 21.5 |

Table XIV, provided below, presents island mode resistive fault trip times, confirming that the PPO agent can detect faults across all resistance levels without loss of speed or accuracy.

TABLE XIV

| | | Trip Times for Resistive Faults in Island Mode (Simulation vs. HIL) | | | | |
|---|---|---|---|---|---|---|
| Fault Location | Fault Type | Fault Resistance (Ω) | Test Environment | Differential Relay (ms) | MODWT Detection (ms) | RL PPO Agent (ms) |
| Between Bus 5-6 | LG (Phase A) | 0.001 | Simulation | 27.2 | 23.5 | 20.5 |
| | | | HIL RTDS | 28.0 | 24.2 | 21.0 |
| | | 100 | Simulation | 38.5 | 25.8 | 21.2 |
| | | | HIL RTDS | 39.2 | 26.5 | 21.8 |
| | | 1000 | Simulation | No trip | 30.2 | 22.5 |
| | | | HIL RTDS | No trip | 31.0 | 23.0 |
| Between Bus 3-8 | LL (Phases A-B) | 0.001 | Simulation | 26.5 | 23.0 | 20.3 |
| | | | HIL RTDS | 27.2 | 23.8 | 20.8 |
| | | 100 | Simulation | 36.8 | 25.0 | 20.8 |
| | | | HIL RTDS | 37.5 | 25.8 | 21.2 |
| | | 1000 | Simulation | No trip | 29.5 | 21.5 |
| | | | HIL RTDS | No trip | 30.2 | 22.0 |

Table XV, provided below, shows trip times for grid-connected HIF events. The PPO agent achieved timely trips for all tested HIF conditions, including high-resistance values where conventional relays failed.

TABLE XV

| | | Trip Times for HIF in Grid-Connected Mode (Simulation vs. HIL) | | | | |
|---|---|---|---|---|---|---|
| Fault Location | Fault Type | HIF Parameters | Test Environment | Differential Relay (ms) | MODWT Detection (ms) | RL PPO Agent (ms) |
| Between Bus 5-6 | LG (Phase A) | $V_p$ = 8 kV, $V_n$ = 5 kV, $R_p$ = 550 Ω, $R_n$ = 550 Ω | Simulation | No trip | 28.5 | 22.0 |
| | | | HIL RTDS | No trip | 29.2 | 22.5 |
| | | $V_p$ = 8.5 kV, $V_n$ = 5.2 kV, $R_p$ = 575 Ω, $R_n$ = 580 Ω | Simulation | No trip | 29.0 | 22.2 |
| | | | HIL RTDS | No trip | 29.8 | 22.8 |
| | | $V_p$ = 7.8 kV, $V_n$ = 4.8 kV, $R_p$ = 600 Ω, $R_n$ = 605 Ω | Simulation | No trip | 29.5 | 22.5 |
| | | | HIL RTDS | No trip | 30.2 | 23.0 |
| Between Bus 3-8 | LG (Phase B) | $V_p$ = 8 kV, $V_n$ = 5 kV, $R_p$ = 550 Ω, $R_n$ = 550 Ω | Simulation | No trip | 28.2 | 21.8 |
| | | | HIL RTDS | No trip | 29.0 | 22.2 |
| | | $V_p$ = 8.5 kV, $V_n$ = 5.2 kV, $R_p$ = 575 Ω, $R_n$ = 580 Ω | Simulation | No trip | 28.8 | 22.0 |
| | | | HIL RTDS | No trip | 29.5 | 22.5 |
| | | $V_p$ = 7.8 kV, $V_n$ = 4.8 kV, $R_p$ = 600 Ω, $R_n$ = 605 Ω | Simulation | No trip | 29.2 | 22.2 |
| | | | HIL RTDS | No trip | 30.0 | 22.8 |

Table XVI, provided below, presents the same HIF tests as Table XV but in island mode, with the PPO agent delivering complete detection and tripping across all parameter sets.

TABLE XVI

| | | Trip Times for HIF in Island Mode (Simulation vs. HIL) | | | | |
|---|---|---|---|---|---|---|
| Fault Location | Fault Type | HIF Parameters | Test Environment | Differential Relay (ms) | MODWT Detection (ms) | RL PPO Agent (ms) |
| Between Bus 5-6 | LG (Phase A) | $V_p$ = 8 kV, $V_n$ = 5 kV, $R_p$ = 550 Ω, | Simulation | No trip | 30.0 | 23.0 |
| | | | HIL RTDS | No trip | 30.8 | 23.5 |

TABLE XVI-continued

| | | | | | | |
|---|---|---|---|---|---|---|
| | | | | Differential Relay (ms) | MODWT Detection (ms) | RL PPO Agent (ms) |
| Fault Location | Fault Type | HIF Parameters | Test Environment | | | |
| | | Rn = 550 Ω Vp = 8.5 kV, Vn = 5.2 kV, Rp = 575 Ω, Rn = 580 Ω | Simulation HIL RTDS | No trip No trip | 30.5 31.2 | 23.2 23.8 |
| | | Vp = 7.8 kV, Vn = 4.8 kV, Rp = 600 Ω, Rn = 605 Ω | Simulation HIL RTDS | No trip No trip | 31.0 31.8 | 23.5 24.0 |
| Between Bus 3-8 | LG (Phase B) | Vp = 8 kV, Vn = 5 kV, Rp = 550 Ω, Rn = 550 Ω | Simulation HIL RTDS | No trip No trip | 29.8 30.5 | 22.8 23.2 |

TABLE XVI-continued

Trip Times for HIF in Island Mode (Simulation vs. HIL)

| | | | | | | |
|---|---|---|---|---|---|---|
| | | | | Differential Relay (ms) | MODWT Detection (ms) | RL PPO Agent (ms) |
| Fault Location | Fault Type | HIF Parameters | Test Environment | | | |
| | | Vp = 8.5 kV, Vn = 5.2 kV, Rp = 575 Ω, Rn = 580 Ω | Simulation HIL RTDS | No trip No trip | 30.2 31.0 | 23.0 23.5 |
| | | Vp = 7.8 kV, Vn = 4.8 kV, Rp = 600 Ω, Rn = 605 Ω | Simulation HIL RTDS | No trip No trip | 30.8 31.5 | 23.2 23.8 |

Table XVII, provided below, examines the effect of 30 dB Gaussian noise on resistive fault detection in grid-connected mode. The PPO agent maintained high detection accuracy and minimal change in tripping time despite noise interference.

TABLE XVII

Effect of 30 dB Noise on Resistive Fault Detection (Grid-Connected)

| Fault Type | Fault Resistance (Ω) | Noise Condition | Differential Relay | MODWT Detection | RL PPO Agent |
|---|---|---|---|---|---|
| LG (Phase A) | 0.001 | No noise | Trip (25.5 ms) | Trip (22.8 ms) | Trip (20.2 ms) |
| | | 30 dB SNR | Trip (26.8 ms) | Trip (24.0 ms) | Trip (20.8 ms |
| | 100 | No noise | Trip (35.2 ms) | Trip (24.6 ms) | Trip (20.5 ms) |
| | | 30 dB SNR | Trip (37.5 ms) | Trip (26.2 ms) | Trip (21.2 ms) |
| | 1000 | No noise | No trip | Trip (28.7 ms) | Trip (21.2 ms) |
| | | 30 dB SNR | No trip | Trip (30.5 ms) | Trip (22.0 ms) |
| LL (Phases A-B) | 0.001 | No noise | Trip (24.8 ms) | Trip (22.5 ms) | Trip (20.1 ms) |
| | | 30 dB SNR | Trip (26.0 ms) | Trip (23.8 ms) | Trip (20.5 ms |
| | 100 | No noise | Trip (33.6 ms) | Trip (24.2 ms) | Trip (20.4 ms) |
| | | 30 dB SNR | Trip (35.8 ms) | Trip (25.8 ms) | Trip (21.0 ms) |
| | 1000 | No noise | No trip | Trip (28.3 ms) | Trip (21.0 ms) |
| | | 30 dB SNR | No trip | Trip (30.0 ms) | Trip (21.8 ms) |

Table XVIII, provided below, reports resistive fault detection in island mode under 30 dB noise. The PPO agent's detection performance remained unaffected, demonstrating strong noise robustness.

TABLE XVIII

Effect of 30 dB Noise on Resistive Fault Detection (Island Mode)

| Fault Type | Fault Resistance (Ω) | Noise Condition | Differential Relay | MODWT Detection | RL PPO Agent |
|---|---|---|---|---|---|
| LG (Phase A) | 0.001 | No noise | Trip (27.2 ms) | Trip (23.5 ms) | Trip (20.5 ms) |
| | | 30 dB SNR | Trip (28.8 ms) | Trip (25.0 ms) | Trip (21.2 ms) |
| | 100 | No noise | Trip (38.5 ms) | Trip (25.8 ms) | Trip (21.2 ms) |
| | | 30 dB SNR | Trip (40.2 ms) | Trip (27.5 ms) | Trip (22.0 ms) |

TABLE XVIII-continued

| | | | Effect of 30 dB Noise on Resistive Fault Detection (Island Mode) | | |
|---|---|---|---|---|---|
| Fault Type | Fault Resistance (Ω) | Noise Condition | Differential Relay | MODWT Detection | RL PPO Agent |
| | 1000 | No noise | No trip | Trip (30.2 ms) | Trip (22.5 ms) |
| | | 30 dB SNR | No trip | Trip (32.0 ms) | Trip (23.2 ms) |
| LL (Phases A-B) | 0.001 | No noise | Trip (26.5 ms) | Trip (23.0 ms) | Trip (20.3 ms) |
| | | 30 dB SNR | Trip (28.0 ms) | Trip (24.5 ms) | Trip (21.0 ms) |
| | 100 | No noise | Trip (36.8 ms) | Trip (25.0 ms) | Trip (20.8 ms) |
| | | 30 dB SNR | Trip (38.5 ms) | Trip (26.8 ms) | Trip (21.5 ms) |
| | 1000 | No noise | No trip | Trip (29.5 ms) | Trip (21.5 ms) |
| | | 30 dB SNR | No trip | Trip (31.2 ms) | Trip (22.2 ms) |

Figure 8:
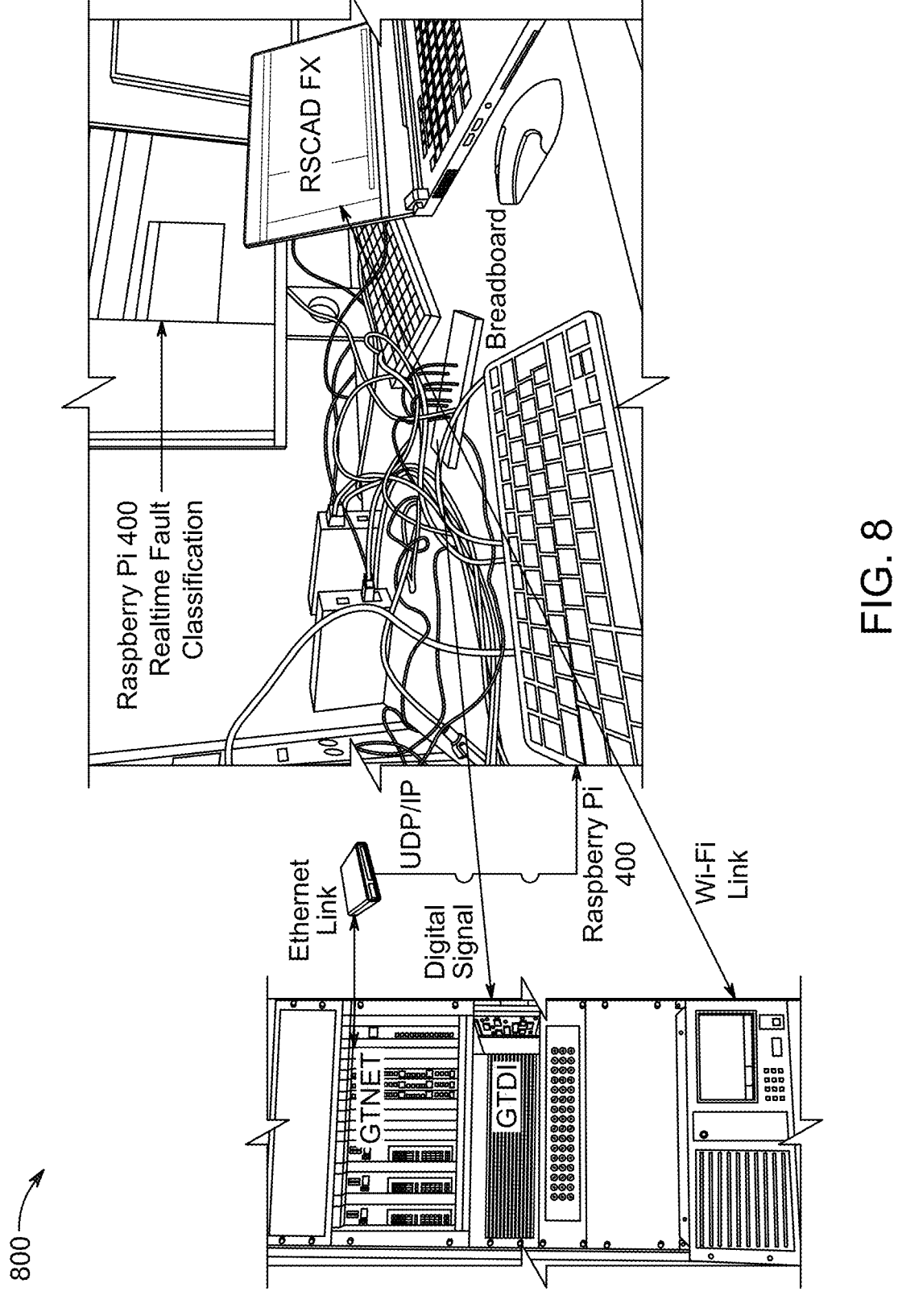
FIG. 8 is a sketch illustrating a Real-Time Digital Simulator and Controller Hardware-in-Loop setup, according to aspects of the present disclosure.

FIG. 8 illustrates an example setup 800 of a real-time digital simulator (RTDS) integrated with a controller hardware-in-the-loop (C-HIL) configuration, according to an example implementation of the present disclosure. The setup 800 includes an RTDS simulator equipped with a GTNETx2-SKT card and a GTDI digital input card, operatively connected to a "Raspberry Pi 400" controller.

In the illustrated example, communication between the RTDS and the Raspberry Pi 400 is established via an Ethernet link using a User Datagram Protocol (UDP) channel to facilitate low-latency data transfer. A GTNETx2-SKT MULTI component within the RSCAD software environment is configured to handle UDP communication, while the Raspberry Pi 400 implements corresponding UDP send/receive blocks to enable real-time transfer of instantaneous three-phase current and voltage measurement data from the RTDS.

The general-purpose input/output (GPIO) pins of the Raspberry Pi 400 are configured to transmit tripping signals back to the RTDS through the GTDI digital input card. The proposed model is developed within a MATLAB Simulink environment and is converted into C++ code via Simulink Coder, enabling the model to operate as a standalone controller capable of executing real-time detection and classification functions within the C-HIL environment.

The present disclosure provides a differential PPO TCAN model configured to detect and classify high-impedance faults and resistive faults in an electric power distribution network. The performance of the model is validated through hardware prototyping and hardware-in-the-loop testing on an RTDS platform. The model accurately identifies various fault conditions without retraining, demonstrating robustness against multiple grid operating scenarios and maintaining high performance even under white Gaussian noise injection. The model operates using local and remote measurements of instantaneous three-phase currents acquired at a low sampling rate of 32 samples per cycle, in combination with maximal overlap discrete wavelet transform (MODWT) preprocessing and a temporal convolution attention-based neural network reinforcement learning framework to achieve high sensitivity and computational efficiency.

Figure 9:
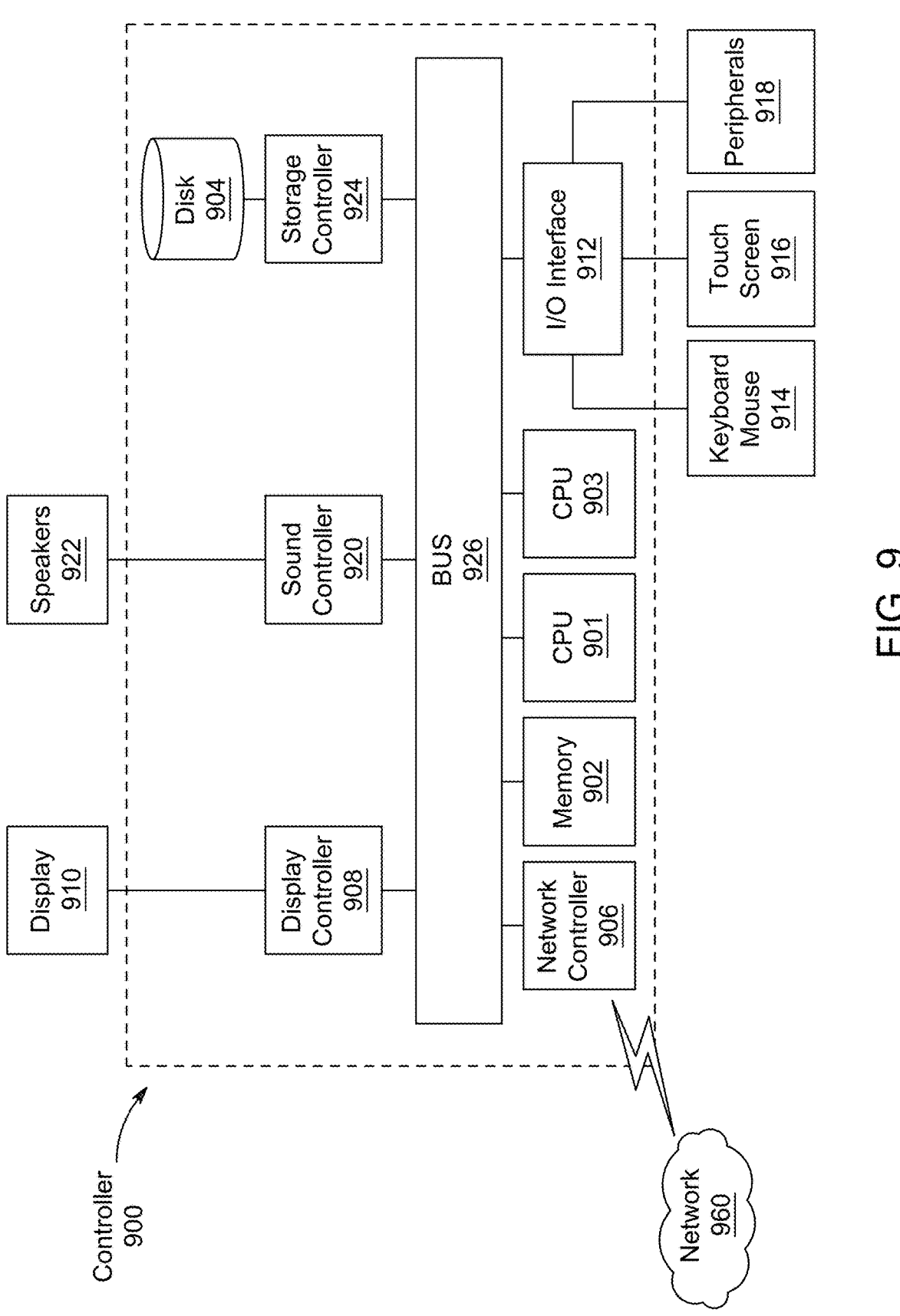
FIG. 9 is a block diagram illustrating a non-limiting example of details of computing hardware used in the computing system, according to certain embodiments.

Next, further details of the hardware description of the computing environment according to exemplary embodiments is described with reference to FIG. 9. In FIG. 9, a controller 900 is described as representative of the system 352 of FIG. 3B in which the controller is a computing device which includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 901, 903 and an operating system such as Microsoft Windows 7, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known. The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
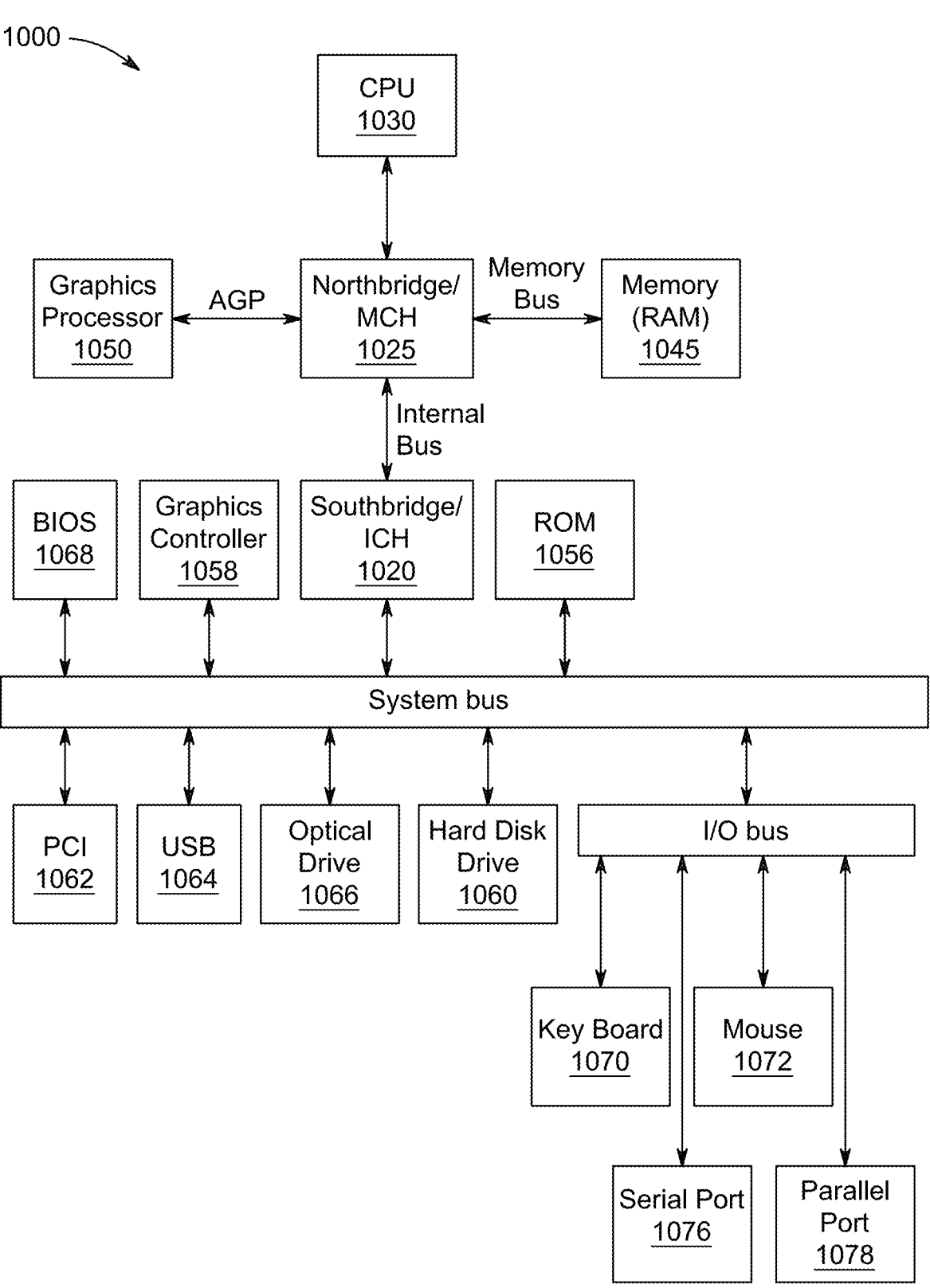
FIG. 10 is a block diagram illustrating an exemplary schematic diagram of a data processing system used within the computing system, according to certain embodiments.

FIG. 10 shows a schematic diagram of a data processing system, according to certain embodiments, for performing the functions of the exemplary embodiments. The data processing system is an example of a computer in which code or instructions implementing the processes of the illustrative embodiments may be located.

In FIG. 10, data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
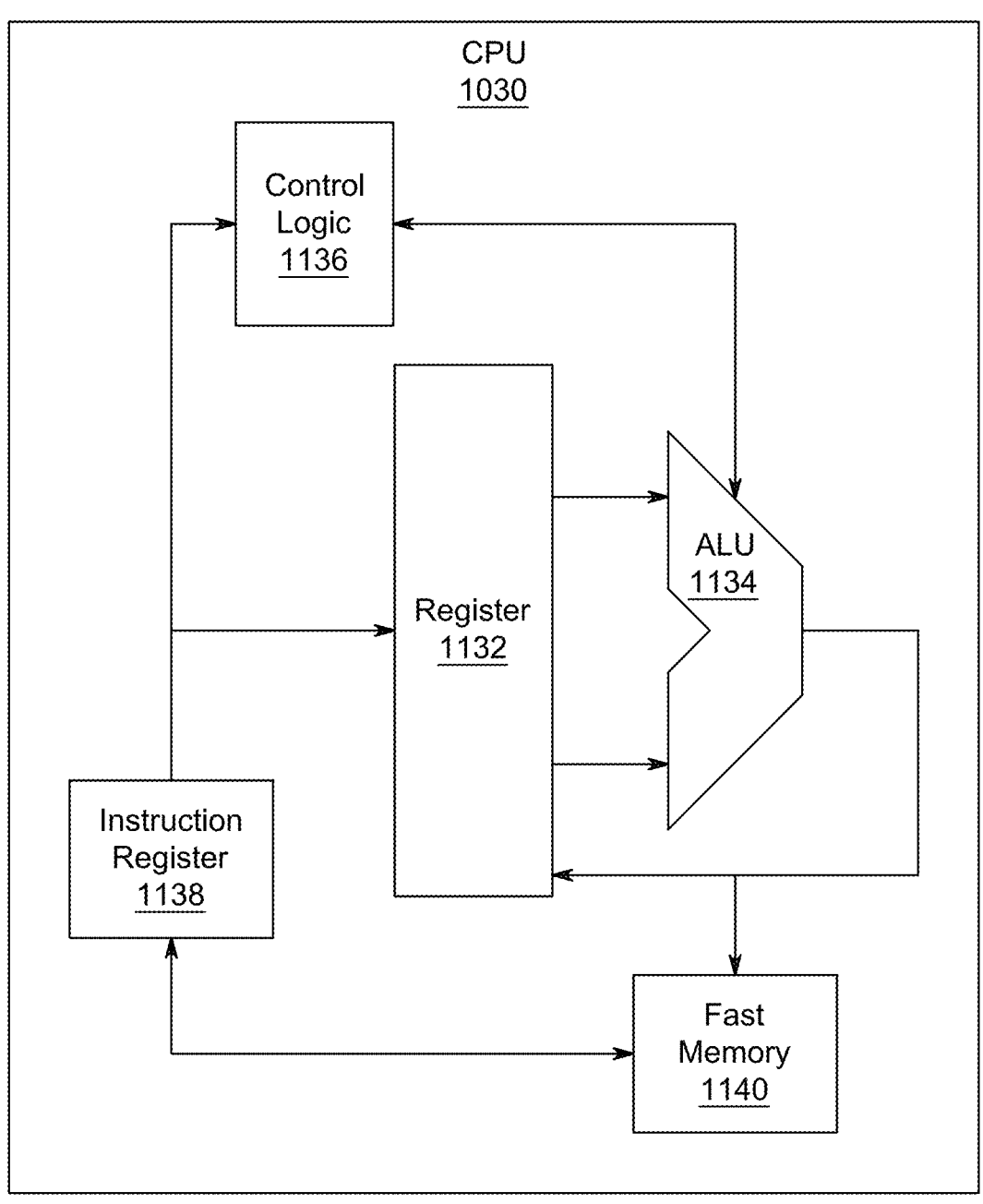
FIG. 11 is a block diagram illustrating an exemplary schematic diagram of a processor used with the computing system, according to certain embodiments.

For example, FIG. 11 shows one implementation of CPU 1030. In one implementation, the instruction register 1138 retrieves instructions from the fast memory 1140. At least part of these instructions are fetched from the instruction register 1138 by the control logic 1136 and interpreted according to the instruction set architecture of the CPU 1030. Part of the instructions can also be directed to the register 1132. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1000 can include that the SB/ICH 1020 is coupled through a system bus to an I/O Bus, a read only memory (ROM) 1156, universal serial bus (USB) port 1064, a flash binary input/output system (BIOS) 1068, and a graphics controller 1058. PCI/PCIe devices can also be coupled to SB/ICH 1088 through a PCI bus 1062. The PCI devices may include, for example, Ethernet adapters, add-in cards, and PC cards for notebook computers. The Hard disk drive 1060 and CD-ROM 1066 can use, for example, an integrated drive electronics (IDE) or serial advanced technology attachment (SATA) interface. In one implementation the I/O bus can include a super I/O (SIO) device.

Further, the hard disk drive (HDD) 1060 and optical drive 1066 can also be coupled to the SB/ICH 1020 through a system bus. In one implementation, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
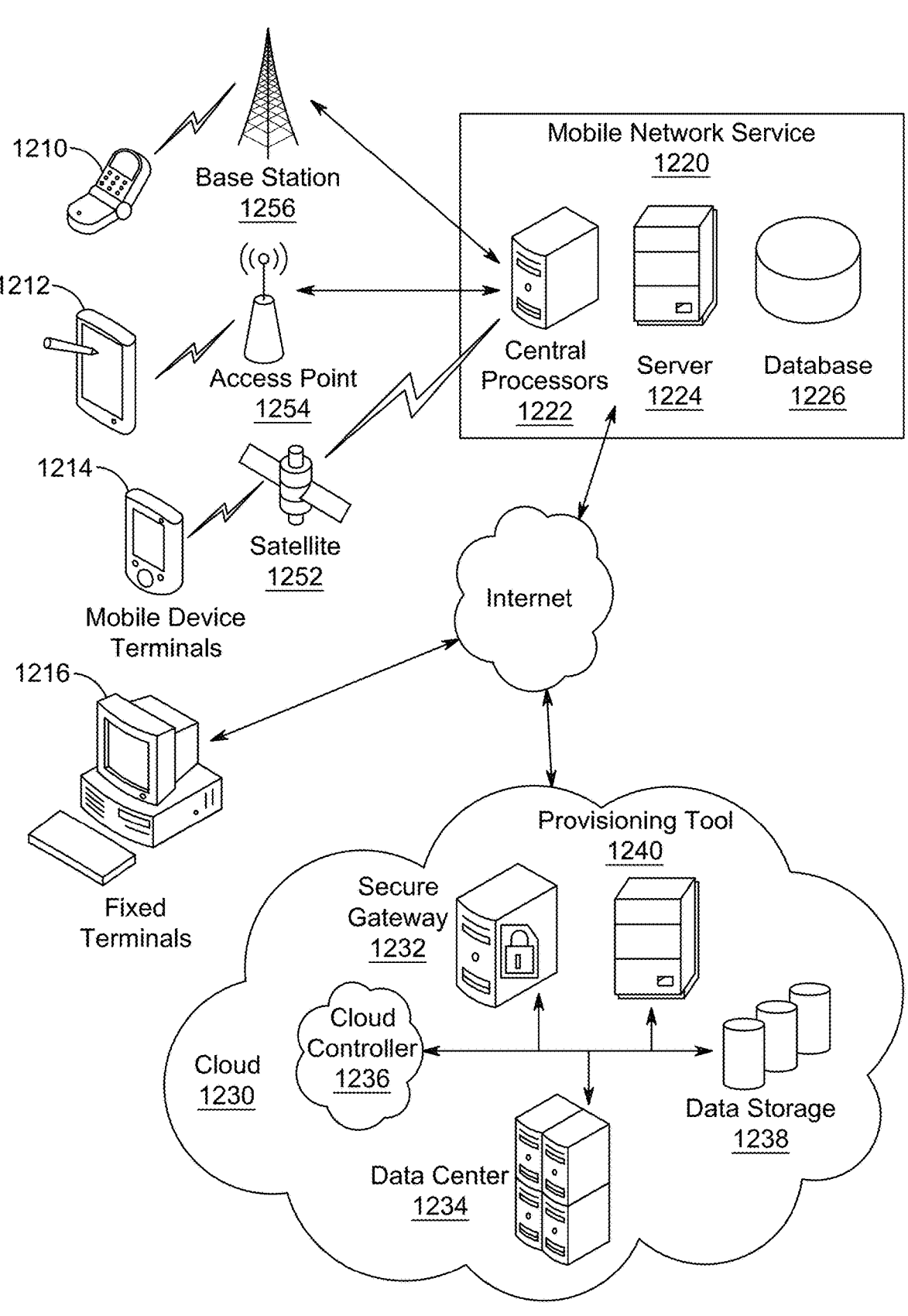
FIG. 12 is a sketch illustrating a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). More specifically, FIG. 12 illustrates client devices including a smart phone 1211, a tablet 1212, a mobile device terminal 1214 and fixed terminals 1216. These client devices may be commutatively coupled with a mobile network service 1220 via a base station 1256, an access point 1254, a satellite 1252 or via an internet connection. The mobile network service 1220 may comprise central processors 1222, a server 1224 and a database 1226. The fixed terminals 1216 and the mobile network service 1220 may be commutatively coupled via an internet connection to functions in cloud 1230 that may comprise a security gateway 1232, a data center 1234, a cloud controller 1236, a data storage 1238 and a provisioning tool 1240. The network may be a private network, such as the LAN or the WAN, or may be the public network, such as the Internet. Input to the system may be received via direct user input and received remotely either in real-time or as a batch process.

Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method for diagnosing a fault in an electric power distribution network, comprising:

measuring three-phase current signals from local and remote terminals of a protected zone on the electric power distribution network;

computing differential current signals based on the measured three-phase current signals;

preprocessing the differential current signals using a filter to smooth the differential current signals;

applying a maximal overlap discrete wavelet transform (MODWT) on the smoothed differential current signals to obtain a plurality of detail coefficients;

providing observation signals comprising the plurality of detail coefficients to a deep reinforcement learning (DRL) agent comprising a temporal convolution attention-based neural network (TCAN), the TCAN DRL agent being trained using a proximal policy optimization (PPO) method to propose a trip action corresponding to a trip or no trip command for a fault condition; and responsive to receiving a trip command, transmitting a trip signal to a circuit breaker and tripping the circuit breaker based on the trip signal.

2. The method of claim 1, wherein the detail coefficients comprise at least a first, second, and third level of MODWT coefficients.

3. The method of claim 2, wherein the detail coefficients are obtained using, $$E_{current} = \left[ \sum_{k=1}^{3} W_k \right]^2$$

where:

$E_{current}$ is an energy level of differential current measurements,

K is a level of the MODWT, and $W_k$ are the MODWT coefficients.

4. The method of claim 1, wherein the observation signals further comprise an action control signal representative of a previous trip action of the TCAN DRL agent.

5. The method of claim 1, wherein the TCAN DRL agent is trained based on test observation signals comprising (i) a plurality of test detail coefficients (ii) a test error signal corresponding to a difference between a past test trip action and a reference ground truth signal, (iii) a test integrated error representative of a history of past errors, and (iv) a test action control signal representative of the past test trip action.

6. The method of claim 5, further comprising:

adding simulated noise to test current signals for use in generating the test observation signals during training of the TCAN DRL agent.

7. The method of claim 1, wherein the three-phase current signals are measured by sampling the three-phase current signals at a sampling rate of at least 32 samples per cycle.

8. The method of claim 1, wherein the differential current signals are smoothed using a Savitzky-Golay filter.

9. The method of claim 1, wherein the temporal convolution attention-based neural network comprises:

a sequence input layer;

a position embedding layer;

at least one self-attention layer; and a plurality of temporal convolution blocks with one or more dilation factors, normalization layers, dropout layers, and activation layers.

10. The method of claim 1, wherein each of the differential current signals is a vector sum of all current signals entering the protected zone.

11. A method for diagnosing a fault in an electric power distribution network, comprising:

receiving a dataset of test observation signals comprising (i) a plurality of test detail coefficients obtained from applying a maximal overlap discrete wavelet transform (MODWT) to smoothed test differential current signals;

(ii) a test error signal corresponding to a difference between a past test trip action and a reference ground truth signal, (iii) a test integrated error representative of a history of past errors, and (iv) a test action control signal representative of the past test trip action, training a deep reinforcement learning (DRL) agent, comprising a temporal convolution attention-based neural network (TCAN), by providing the test observation signals to the TCAN DRL agent to propose, based on the test observation signals, a trip action corresponding to a trip or no-trip command for a fault condition;

wherein the TCAN DRL agent is trained using a proximal policy optimization (PPO) method responsive to the trip command, transmitting a trip signal to a circuit breaker and tripping the circuit breaker based on the trip signal.

12. A system for diagnosing a fault in an electric power distribution network, comprising:

a processor configured to:

measure three-phase current signals from local and remote terminals of a protected zone on the electric power distribution network;

compute differential current signals based on the measured three-phase current signals;

preprocess the differential current signals using a filter to smooth the differential current signals;

apply a maximal overlap discrete wavelet transform (MODWT) on the smoothed differential current signals to obtain a plurality of detail coefficients;

provide observation signals comprising the plurality of detail coefficients to a deep reinforcement learning (DRL) agent comprising a temporal convolution attention-based neural network (TCAN), the TCAN DRL agent being trained using a proximal policy optimization (PPO) method to propose a trip action corresponding to a trip or no trip command for a fault condition, and

transmit, responsive to receiving a trip command, a trip signal to a circuit breaker and tripping the circuit breaker based on the trip signal.

13. The system of claim 12, wherein the detail coefficients comprise at least a first, second, and third level of MODWT coefficients.

14. The system of claim 13, wherein the processor is further configured to obtain the detail coefficients using, $$E_{current} = \sum_{k=1}^{3} (W_k)^2$$

where:

$E_{current}$ is an energy level of differential current measurements,

K is a level of the MODWT, and $W_k$ are the MODWT coefficients.

15. The system of claim 12, wherein the observation signals further comprise an action control signal representative of a previous trip action of the TCAN DRL agent.

16. The system of claim 12, wherein the TCAN DRL agent is trained based on test observation signals comprising (i) a plurality of test detail coefficients (ii) a test error signal corresponding to a difference between a past test trip action and a reference ground truth signal, (iii) a test integrated error representative of a history of past errors, and (iv) a test action control signal representative of the past test trip action.

17. The system of claim 16, further comprising:

adding simulated noise to test current signals for use in generating the test observation signals during training of the TCAN DRL agent.

18. The system of claim 12, wherein the processor is configured to measure the three-phase current signals by sampling the three-phase current signals at a sampling rate of at least 32 samples per cycle.

19. The system of claim 12, wherein the processor is configured to smooth the differential current signals using a Savitzky-Golay filter.

20. The system of claim 12, wherein the temporal convolution attention-based neural network comprises:

a sequence input layer;

a position embedding layer;

at least one self-attention layer; and a plurality of temporal convolution blocks with one or more dilation factors, normalization layers, dropout layers, and activation layers.

* * * * *